(12) United States Patent
Tzabari et al.

(10) Patent No.: US 10,701,336 B2
(45) Date of Patent: Jun. 30, 2020

(54) RECTIFYING A SEQUENCE OF STEREO IMAGES

(71) Applicant: SAMSUNG ELECTRONICS CO., LTD., Suwon-si, Gyeonggi-do (KR)

(72) Inventors: Assaf Tzabari, Tel Aviv (IL); Doron Sabo, Petah-Tikwa (IL); Roee Sfaradi, Nes Ziona (IL); Omry Sendik, Tel Aviv (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 8 days.

(21) Appl. No.: 16/111,918

(22) Filed: Aug. 24, 2018

(65) Prior Publication Data

US 2020/0068185 A1   Feb. 27, 2020

(51) Int. Cl.
*H04N 13/00* (2018.01)
*G06T 7/00* (2017.01)
*G06K 9/46* (2006.01)
*G06T 5/00* (2006.01)
*G06K 9/62* (2006.01)
*H04N 13/167* (2018.01)
*G06T 7/73* (2017.01)
(Continued)

(52) U.S. Cl.
CPC ......... *H04N 13/167* (2018.05); *G06K 9/6202* (2013.01); *G06T 7/285* (2017.01); *G06T 7/74* (2017.01); *H04N 13/239* (2018.05); *H04N 13/296* (2018.05); *G06T 3/20* (2013.01); *G06T 3/60* (2013.01); *G06T 5/006* (2013.01); *G06T 2207/10012* (2013.01)

(58) Field of Classification Search
CPC .. H04N 13/167; H04N 13/296; H04N 13/239; G06T 7/74; G06T 7/285; G06T 3/20; G06T 3/60; G06T 5/006; G06T 2207/10012; G06K 9/6202
USPC .......................................................... 348/46
See application file for complete search history.

(56) References Cited

U.S. PATENT DOCUMENTS 8,849,010 B2    9/2014 Li et al.
2016/0234473 A1   8/2016 Choi et al.
(Continued)

OTHER PUBLICATIONS

Andrea Fusiello, et al., "A Compact Algorithm for Rectification of Stereo Pairs," Jan. 16, 1999, pp. 1-8.
(Continued)

*Primary Examiner* — Hee-Yong Kim
(74) *Attorney, Agent, or Firm* — F. Chau & Associates, LLC

(57) ABSTRACT

A method of rectifying stereo images includes providing a plurality of pairs of sets of keypoints extracted from a pair of current stereo images and from a pair of previous stereo images wherein each pair of stereo images includes a left image and a right image respectively obtained from a left camera and a right camera; providing a plurality of pairs of sets of next-choice-match points extracted from the pair of current stereo images and the pair of previous stereo images; finding one or more anchor points in a left previous image; finding a right linking point which is the corresponding keypoint in the right previous image, and a left linking point which is the corresponding keypoint in the left current image; finding a closing point; and calculating a cost from the right linking point, the left linking point, and the closing point.

20 Claims, 17 Drawing Sheets

(51) Int. Cl.
 *G06T 7/285* (2017.01)
 *H04N 13/296* (2018.01)
 *H04N 13/239* (2018.01)
 *G06T 3/60* (2006.01)
 *G06T 3/20* (2006.01)

(56) References Cited

U.S. PATENT DOCUMENTS

2016/0277650 A1  9/2016 Nagaraja et al.
2016/0321838 A1* 11/2016 Barone .............. H04N 1/00827

OTHER PUBLICATIONS

Richard I. Hartley, "Theory and Practice of Projective Rectification," International Journal of Computer Vision 35(2), pp. 115-127 (1999).
Zhengyou Zhang, "Determining the Epipolar Geometry and Its Uncertainty: A Review," International Journal of Computer Vision 27(2), pp. 181-198 (1998).
Richard I. Hartley, "An Investigation of the Essential Matrix," 1995, pp. 1-40.
Thao Dang, et al., "Continuous Stereo Self-Calibration by Camera Parameter Tracking," IEEE Transactions on Image Processing, vol. 18, No. 7, Jul. 2009, pp. 1538-1550.
Richard Hartley, et al., "Multiple View Geometry in Computer Vision," Second Edition, 2000, pp. 1-865.

* cited by examiner

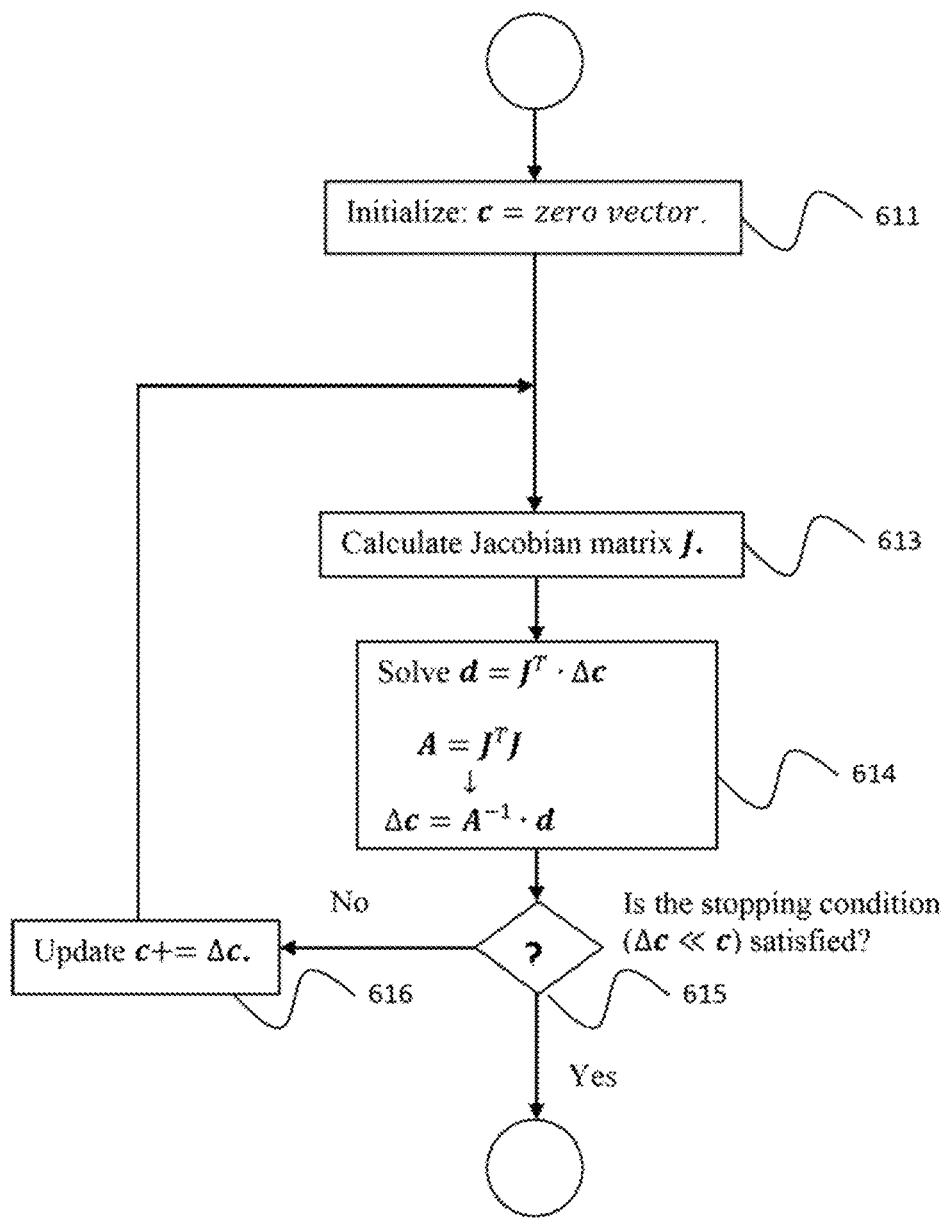

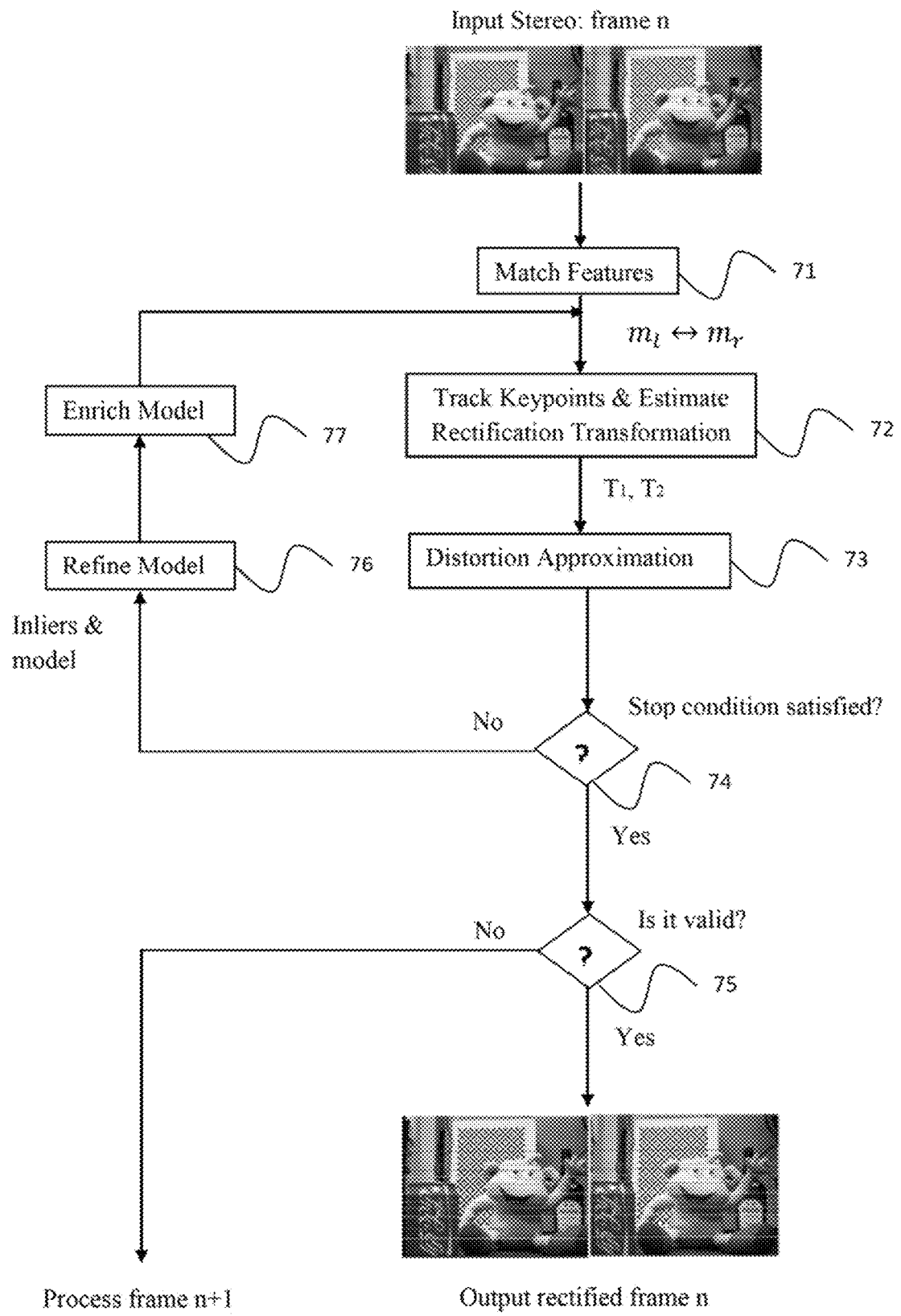

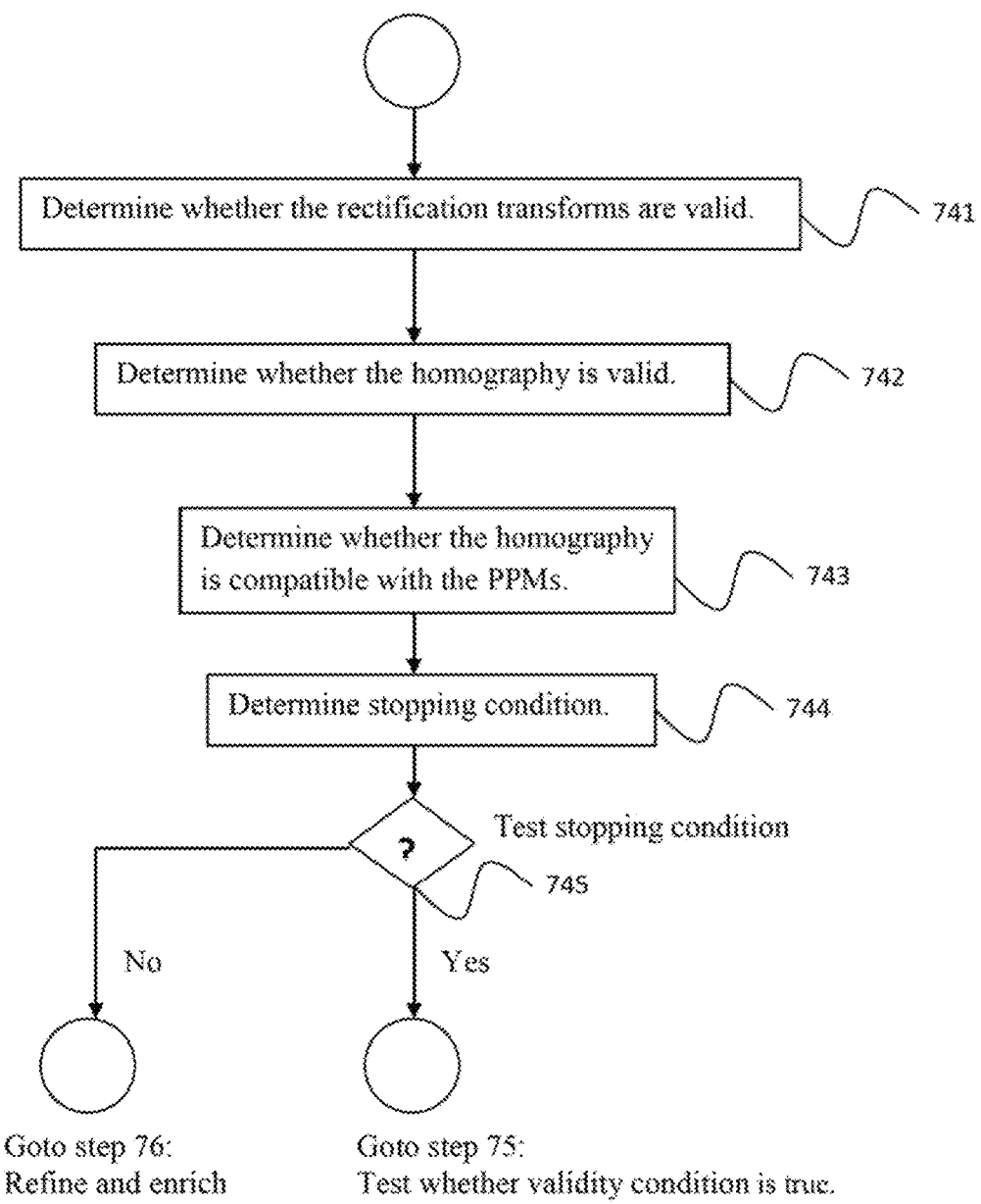

RECTIFYING A SEQUENCE OF STEREO IMAGES

BACKGROUND

1. Technical Field

Embodiments of the present disclosure are directed to stereo computer vision, in particular, to a method and a system for rectifying right and left images pairs in uncalibrated-stereo video sequence, based on features matching and using efficient tracking.

2. Discussion of the Related Art

Stereo rectification generates image pairs with parallel horizontal epipolar lines such that corresponding features in both images lie on collinear lines. In this process, rectifying transformations are applied to the captured images, so that conjugate epipolar lines become collinear and horizontal. These transformations depend entirely on the parameters of the stereo rig, specifically the relative position of the cameras and their intrinsic parameters, which are determined during calibration. However, even after calibration, changes in temperature and mechanical stress can change the relative orientation. In addition, the intrinsic parameters may slightly change even during video capturing. Hence, a rectifying system generally rectifies uncalibrated stereo, not knowing the exact parameters of the stereo rig. A suitable method is therefore required to estimate the rectifying transformations.

Prior art methods are either expensive in computations, such as bundle adjustment with tracking, or suffer from distortion and robustness problems, as in homography based 2D tracking approaches and algebraic or quasi-Euclidian estimation.

SUMMARY

Embodiments of the disclosure process sequences of stereo images. Embodiments of the present disclosure provide new tracking approaches which are efficient and reliable for rectification, as well as an estimation method and a system for estimating rectification transformations for stereo images in video sequences that reduces the projective distortion on sequences of images during the life-time of a device.

According to an embodiment of the disclosure, there is provided a method of rectifying stereo images, including: providing a sequence of stereo video images; providing a plurality of pairs of sets of keypoints extracted from a pair of current stereo images in the sequence of stereo video images and from a pair of previous stereo images in the sequence of stereo video images, wherein each pair of stereo images includes a left image and a right image respectively obtained from a left camera and a right camera; providing a plurality of pairs of sets of next-choice-match points extracted from the pair of current stereo images and the pair of previous stereo images; finding one or more anchor points in a left previous image, wherein an anchor point is a keypoint in the left previous image that has both a corresponding keypoint in a right previous image and a corresponding keypoint in a left current image; finding a right linking point which is the corresponding keypoint in the right previous image, and a left linking point which is the corresponding keypoint in the left current image; finding a closing point which is the keypoint in the right current image that corresponds to corresponding keypoint in the right previous image and the corresponding keypoint in the left current image; and calculating a cost from the right linking point, the left linking point, and the closing point.

According to a further embodiment of the disclosure, the method includes repeating for all anchor points the steps of finding a right linking point, finding a left linking point, finding a closing point, and calculating a tracking cost; selecting those keypoints whose tracking cost is less than a predetermined threshold to a list $S_n^{corr}$ of candidate keypoints, wherein n is an index of the pair of current stereo images; calculating a homography matrix H from the candidate keypoint list; calculating a fundamental matrix F from the candidate keypoint list; calculating, from the homnography matrix and the fundamental matrix, perspective projection matrices $P_0$, $P_1$ that project, for each of the left camera and the right camera, respectively, a point in a 3-dimensional space $\mathcal{P}^3$ to a point in a 2-dimensional image plane $\mathcal{P}^2$; calculating rectifying transformations $T_l$ and $T_r$ from the perspective projection matrices that map the image-planes of the perspective projection matrices to the image-planes of the rectified perspective projection matrices, respectively; and applying transformation $T_l$ on the left image and transformation $T_r$ on the right image to yield a pair of rectified images.

According to a further embodiment of the disclosure, finding a linking point includes providing a set of keypoints in an image and a set of next-choice-match points in that image, and finding a point in the set of next-choice-match points that is in the set of keypoints.

According to a further embodiment of the disclosure, finding a closing point includes providing a first set of next-choice-match points in an image and a second set of next-choice-match points in that image, and finding a point in the first set of next-choice-match points that matches a point in the second set of next-choice-match points.

According to a further embodiment of the disclosure, the plurality of pairs of sets of keypoints includes a set of pairs of corresponding-keypoints in the previous stereo images $\{p_{l_{n-1}}^{corr}, p_{r_{n-1}}^{corr}\}$, a set of pairs of corresponding-keypoints in the current stereo images $\{p_{l_n}^{corr}, p_{r_n}^{corr}\}$, a set of pairs of matched-keypoints in adjacent left images $\{p_{l_{n-1}}^{adj}, p_{l_n}^{adj}\}$, a set of pairs of matched-keypoints in adjacent right images $\{p_{r_{n-1}}^{adj}, p_{r_n}^{adj}\}$; and the plurality of pairs of sets of next-choice-match points includes sets $\tilde{p}_{r_n}^{corr}, \tilde{p}_{r_{n-1}}^{corr}, \tilde{p}_{r_n}^{adj}$ and $\tilde{p}_{l_n}^{adj}$ that respectively correspond to the sets $p_{r_n}^{corr}, p_{r_{n-1}}^{corr}, p_{r_n}^{adj}$ and $p_{l_n}^{adj}$.

According to a further embodiment of the disclosure, calculating the tracking cost from the right linking point, the left linking point, and the closing point includes calculating cost $\triangleq$ $\alpha_1 \| KP_{l_n}[p_{l_n}[i]] - KP_{l_n}[\tilde{p}_{l_n}^{adj}[k][k_{ROA}]] \| + \alpha_2 \| KP_{r_{n-1}}[p_{r_{n-1}}[i]] - KP_{r_{n-1}}[\tilde{p}_{r_{n-1}}^{corr}[j][j_{ROA}]] \| + \alpha_3 \| KP_{r_n}[p_{r_n}[i]] - KP_{r_n}[\tilde{p}_{r_n}^{adj}[l][l_{ROA}]] \|$, wherein i is an index of an anchor point, k is an index of a keypoint in the set $\tilde{p}_{l_n}^{adj}$ that corresponds to keypoint i, j is an index of a keypoint in the set $\tilde{p}_{r_{n-1}}^{corr}$ that corresponds to keypoint i, l is an index of the right linking point in the set $p_{r_n}^{adj}$, $k_{ROA}$ is an index of the left linking point in the set $\tilde{p}_{l_n}^{adj}$, $j_{ROA}$ is an index of the right linking point in the $\tilde{p}_{r_{n-1}}^{corr}$, $l_{ROA}$ is an index of the closing point in the set $\tilde{p}_{r_n}^{adj}$, $p_{l_n}[i]$ is the left linking point for anchor point i, $p_{r_{n-1}}[i]$ is the right linking point for anchor point i, $p_{r_n}[i]$ is the closing point for anchor point i, $\tilde{p}_{l_{n-1}}^{adj}[k][k_{ROA}]$, and $KP_{l_n}[\ ], KP_{r_{n-1}}[\ ],$ and $KP_{r_n}[\ ]$ represent coordinates of their respective keypoint arguments.

According to a further embodiment of the disclosure, the homography matrix H is defined as $$H = \begin{pmatrix} 1 & -\theta_H & f \cdot \psi_H \\ \theta_H & 1 & -f \cdot \phi_H \\ -\frac{1}{f} \cdot \psi_H & \frac{1}{f} \cdot \phi_H & s \end{pmatrix},$$

wherein Euler angles $\theta_H$, $\psi_H$ and $\phi_H$ represent small angle approximations for roll, yaw and pitch respectively, s is a zoom-in factor and f is a pre-determined approximate focal length. Calculating the homography matrix includes finding a vector $c = (\phi_H, \psi_H, \theta_H, s)^T$ that minimizes a non-linear functional $$\underset{c}{\operatorname{argmin}} \|\hat{x}_r(c) - x_r\|_{l_2}^2 + \|\hat{y}_r(c) - y_r\|_{l_2}^2, \text{ wherein } \hat{x}_r = \frac{f_u(c)}{g(c)},$$

$$\hat{y}_r = \frac{f_v(c)}{g(c)}, \text{ and } f_c(c) \triangleq x_l - y_l \cdot c[3] + f \cdot c[2],$$

$$f_v(c) \triangleq x_l \cdot c[3] + y_l - f \cdot c[1], \text{ and}$$

$$g(c) \triangleq -\frac{1}{f} \cdot x_l \cdot c[2] + \frac{1}{f} \cdot y_l \cdot c[1] + c[4].$$

According to a further embodiment of the disclosure, the fundamental matrix F is a rank-2 matrix that maps each keypoint $m_r(i)$ in a right image to its epipolar line in a corresponding left image: $m_l(i)^T \cdot F \cdot m_r(i) = 0$, for all keypoints i. Calculating the fundamental matrix comprises calculating a matrix $\tilde{F}$ that minimizes a mapping error between the right image and the left image, and finding a rank-2 matrix F that is closest to the matrix $\tilde{F}$ that minimizes the mapping error.

According to a further embodiment of the disclosure, the perspective projection matrices $P_0$, $P_1$ are defined as $P_0 = K_0 [I|0]$, $P_1 = K_1[R|t]$, wherein $$K_i = \begin{pmatrix} f_i & 0 & 0 \\ 0 & f_i & 0 \\ 0 & 0 & 1 \end{pmatrix}, i = 0, 1, R = \begin{pmatrix} R_{1,1} & R_{1,2} & R_{1,3} \\ R_{2,1} & R_{2,2} & R_{2,3} \\ R_{3,1} & R_{3,2} & R_{3,3} \end{pmatrix}, t = \begin{pmatrix} t_{1,1} \\ t_{2,1} \\ t_{3,1} \end{pmatrix},$$

I is a 3×3 identity matrix and 0 is 1×3 zeros vector $$\begin{pmatrix} 0 \\ 0 \\ 0 \end{pmatrix},$$

R is a rotation matrix, t is a translation vector, and the parameters fi are determined from a singular value decomposition of the fundamental matrix F, wherein rotation R followed by translation t present a mapping of points in a 3-dimensional world to a coordinate system of the right camera.

According to a further embodiment of the disclosure, rectifying transformations $T_l$ and $T_r$ are defined as $T_l = K_0 \cdot \tilde{R} \cdot K_0^{-1}$, $T_r = K_0 \cdot \tilde{R} \cdot R^T \cdot K_1^{-1}$, wherein R is a rotation matrix that represents an orientation of the right camera relative to the left camera, and $(-R^T t)$ represents a center of the right camera in a coordinates-system of the left camera, and $$\tilde{R} \triangleq \begin{bmatrix} \left(\frac{1}{\|R^T t\|} \cdot R^T t\right)^T \\ (0,0,1) \times \left(\frac{1}{\|R^T t\|} \cdot R^T t\right)^T \\ \left(\frac{1}{\|R^T t\|} \cdot R^T t\right)^T \times \left((0,0,1) \times \left(\frac{1}{\|R^T t\|} \cdot R^T t\right)^T\right) \end{bmatrix}.$$

According to a further embodiment of the disclosure, the method includes reducing projective distortion in the pair of rectified images by estimating an error in the rectifying transformations $T_l$ and $T_r$ for each pair of images, and skipping a current pair if an estimated error is above a threshold, by calculating rectifying transformations $T_l$ and $T_r$ for informative frames of a scene whose estimated error is below a threshold and using these rectifying transformations $T_l$ and $T_r$ for less informative frames, and by incorporating those keypoints in the list of candidate keypoints into the plurality of pairs of sets of keypoints of subsequent pairs of stereo images.

According to a further embodiment of the disclosure, reducing projective distortion includes using the fundamental matrix and the corresponding keypoints set $\{p_{l_n}^{corr}, p_{r_n}^{corr}\}$ and the arrays of rank-ordered next choice matches in the right image $\tilde{p}_{r_n}^{corr}$ to update, without loss of generality, the rank-ordered array of index m, so that correspondences in $\tilde{p}_{r_n}^{corr}[m]$ are reordered by their Euclidian 2D distance to the epipolar line of the corresponding keypoint in the left image, $p_{l_n}^{corr}[m]$.

According to a further embodiment of the disclosure, reducing projective distortion includes providing a list of corresponding-keypoints that includes coordinates of a keypoint in the left image, coordinates of a corresponding keypoint in the right image, a timestamp indexing a last frame where the correspondence was tagged as an inlier, and the cost, organizing the list of correspondences according to a location of a corresponding keypoint in the left image, adding those correspondences that minimize the tracking cost to an enriched list of candidate keypoints, wherein points in the enriched list are used along with points in the list of candidate keypoints to calculate the fundamental matrix.

According to another embodiment of the disclosure, there is provided a system for estimating rectification transformations in stereo video sequences, including: a pair of actuators, one for each camera of stereo video acquisition system, wherein an each actuator is an electromechanical module inside each camera that controls a focus and indirectly changes a focal length of each camera; a pair of look-up tables (LUTs) that respectively correspond to the pair of actuators that map between a state of each actuator and an approximate focal length value of the camera associated with each actuator; and at least one processor in signal communication with the pair of look-up tables and programmed to implement a rectification transformation estimation unit that estimates rectification transformations in pairs of stereo images extracted from a stereo video sequence by tracking keypoints for a current pair of stereo images, selecting those keypoints whose cost is less than a predetermined threshold to a list of candidate keypoints, calculating a homography matrix H from the candidate keypoint list and the approximate focal lengths of each camera, calculating a fundamental matrix F from the candidate keypoint list, calculating, from the homography matrix and the fundamental matrix, perspective projection matrices $P_0$, $P_1$ that project, for each of the left camera and the right camera, respectively, a point in a 3-dimensional space $\mathcal{P}^3$ to a point in a 2-dimensional image plane $\mathcal{P}^2$, calculating rectifying transformations $T_l$ and $T_r$ from the perspective projection matrices that map the image-planes of the perspective projection matrices to the image-planes of the rectified perspective projection matrices, respectively, and applying transformation $T_l$ on the left image and transformation $T_r$ on the right image to yield a pair of rectified images.

According to a further embodiment of the disclosure, when the homography matrix H is valid OR the rectification transformations are valid then the rectification transformation estimation unit outputs the valid rectification transformations, otherwise the rectification transformation estimation unit processes a next pair of stereo images, when the homography matrix H is compatible with the perspective projection matrices then the rectification transformation estimation unit outputs focal length values estimated from the perspective projection matrices to the LUTs and outputs the valid rectification transformations, and when the perspective projection matrices are invalid and the homography matrix is valid, then the rectification transformation estimation unit outputs the homography matrix, otherwise the rectification transformation estimation unit outputs the valid rectification transformations.

According to a further embodiment of the disclosure, tracking keypoints for a current pair of stereo images includes providing a plurality of pairs of sets of keypoints extracted from a pair of current stereo images in the sequence of stereo video images and from a pair of previous stereo images in the sequence of stereo video images, wherein each pair of stereo images includes a left image and a right image respectively obtained from a left camera and a right camera, providing a plurality of pairs of sets of next-choice-match points extracted from the pair of current stereo images and the pair of previous stereo images, finding one or more anchor points in a left previous image, wherein an anchor point is a keypoint in the left previous image that has both a corresponding keypoint in a right previous image and a corresponding keypoint in a left current image, finding a right linking point which is the corresponding keypoint in the right previous image, and a left linking point which is the corresponding keypoint in the left current image, finding a closing point which is the keypoint in the right current image that corresponds to corresponding keypoint in the right previous image and the corresponding keypoint in the left current image, and calculating a cost from the right linking point, the left linking point, and the closing point.

According to another embodiment of the disclosure, there is provided a non-transitory program storage device readable by a computer, tangibly embodying a program of instructions executed by the computer to perform the method steps for rectifying stereo images.

BRIEF DESCRIPTION OF THE DRAWINGS

FIG. 6A is a flow chart of a method of estimating a homography matrix, according to an embodiment of the disclosure.

FIG. 7 is a flowchart of a method for iterative minimization of a projective distortion, according to an embodiment of the disclosure.

FIG. 7A is a flowchart of a method for validating the rectification result and checking the stopping condition, according to an embodiment of the disclosure.

DETAILED DESCRIPTION OF EXEMPLARY EMBODIMENTS

Figure 1:
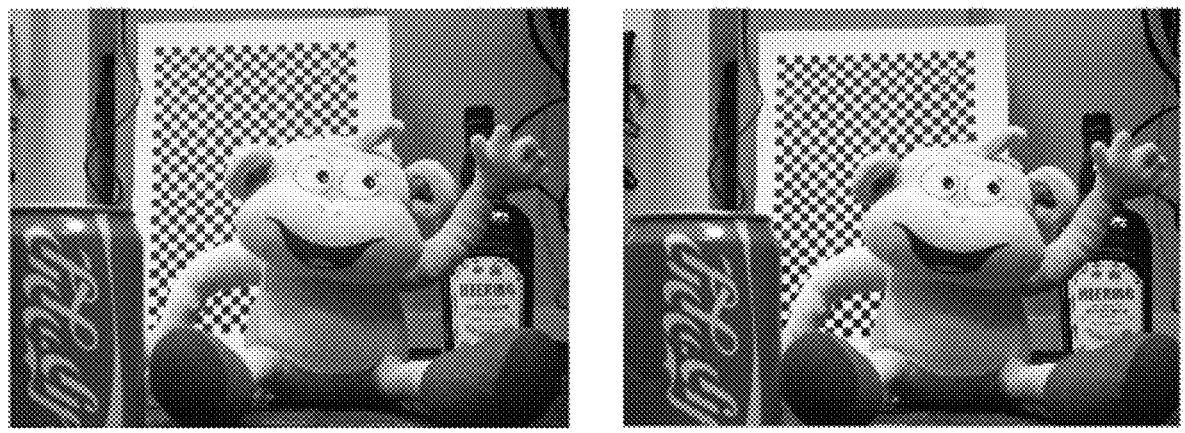
FIG. 1 illustrates an example of a stereo images pair, the detected features and selected keypoints, according to an embodiment of the disclosure.
Figure 1:
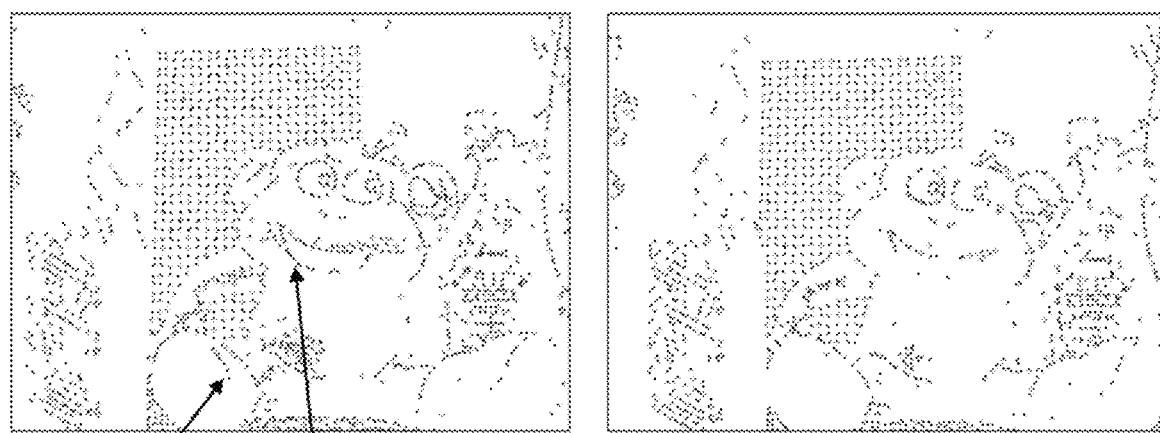

Exemplary embodiments of the disclosure as described herein generally provide systems and methods for estimating rectification transformations for stereo images in video sequences. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

A tracking method according to an embodiment is efficient and combines with outliers-rejection that relies on triangulation. This incorporates 3D information in a frame-by-frame tracking scheme that has low computational cost. Embodiments of the present disclosure filter the corresponding features using a tracking paradigm that is based on temporal matching between adjacent frames on each camera. An estimation includes several stages that finally provide perspective projection matrices, which yield consistent rectifying transformations and robustness. An estimation method according to an embodiment includes a model of perspective projection matrices that are extracted from the epipolar geometry between the cameras. The parameters of the epipolar geometry are estimated based on corresponding features between the stereo pair of images. In addition, feature correspondences from previous scenes are exploited when the estimation input data requires enrichment. Additional embodiments incorporate tracking with estimation, and include monitoring and iteratively minimizing the projective distortion, under pre-defined constraints on the size of the view-window in the rectified images.

Features Matching

Figure 11:
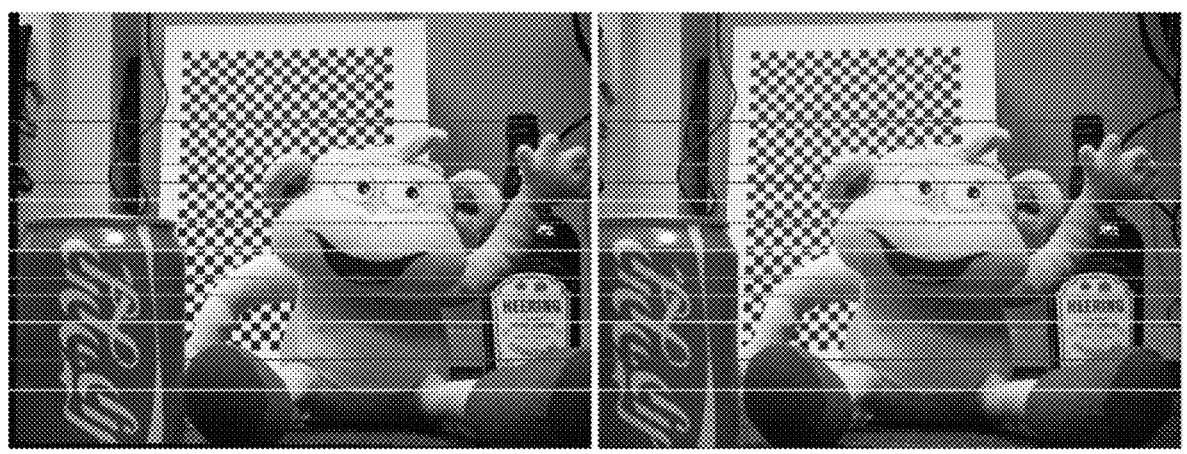
FIG. 11 shows an indoor scene example with various depths, according to an embodiment of the disclosure.

According to an embodiment, a designated apparatus that contains a stereo rig provides images at a specified framerate. According to embodiments, the photometric properties of both sensors of the stereo rig are known. This allows detection of keypoints, extraction of features and correspondences matching. Any point in an image can be a keypoint; naturally interesting keypoints are on corners or detailed patterns. Embodiments of the disclosure can work with any keypoint detector. Exemplary keypoint detectors include the FAST and Harris algorithms. It is typical in feature matching mechanisms that a keypoints detector selects "strong" keypoints, such as points that are local maximum in their surrounding area. FIG. 11 shows a typical result of the detected keypoints and the selected keypoints.

For example:

Keypoints can be detected by the FAST or Harris corners detection algorithms, as illustrated in FIG. 1, which illustrates an example of a stereo images pair in the upper pair of images, the detected keypoints 11 and selected keypoints 12. The lower left image of FIG. 1 shows keypoints in the left image of the stereo-rig while the lower right image of FIG. 1 shows keypoints in the right image of the stereo-rig.

To match features, a feature extractor computes a descriptor for each selected keypoint.

Features within images of the same sensor can be matched based on template matching techniques, such as the SAD measure, or binary descriptors such as BRIEF. FIG. 1 illustrates the input to a stereo rectification according to an embodiment of the disclosure, which is a sparse keypoint coverage of the details in the frame, so that only local-maximum features are selected as keypoints. Thus, the size of the input is proportional to the number of keypoints, which is much smaller than the number of pixels.

Figure 2:
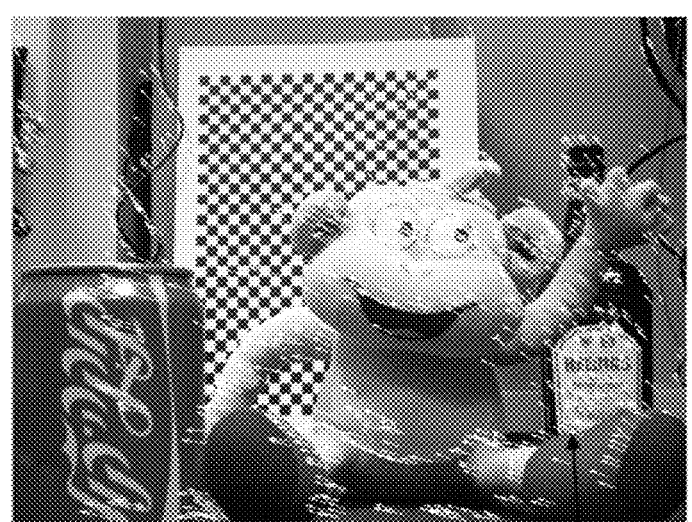
FIG. 2 depicts motion vectors that visualize the corresponding or matching features, according to an embodiment of the disclosure.

A system according to an embodiment of the present disclosure receives keypoints and correspondence information along with the input stereo images. A feature matching step searches for keypoint or "features" with similar, i.e., "matching", descriptors, between source and target frames. FIG. 2 shows a typical result of the matcher, represented by vector from a keypoint in the source frame to the matched keypoint in the target frame. This information can be visualized by, for example, motion vectors 20 as shown in FIG. 2, which shows motion vectors that visualize the corresponding or matching features, where vectors attached to keypoints describe the displacement of the keypoints from source to destination. In the case of corresponding features, the source is the left image and the destination is the right image of the stereo pair. Embodiments of the present disclosure can also store features and correspondences from the previous frame of both the left and right cameras.

Finally, according to embodiments of the disclosure, matching and correspondence information can contain outliers or matching errors, as can happen when applying extraction and matching methods described above. Moreover, a system according to an embodiment can invoke a matching procedure with different search area constraints and receive refined information during the estimation.

Embodiments of the disclosure produce rank-ordered arrays (ROAs). An ROA_SIZE parameter indicates the maximum number of elements in each ROA. It is set by a matcher. That is, a matcher not only selects a single best matching keypoint, but also lists its next choices, such as its $2^{nd}$ best choice and $3^{rd}$ best choice, when ROA_SIZE is set to 3. These best choices are stored in an array called a Rank-Ordered Array (ROA). The choices are sorted according to their rank, i.e. the best matched ($1^{st}$ best choice) is the first element, the $2^{nd}$ best choice is the $2^{nd}$ element in the array, etc. Note that each ROA is 1-dimensional array.

Rectification Overview

According to embodiments of the disclosure, a method and a system for estimating the rectification transformations receives right and left stereo images with a list of keypoints in each image and corresponding features between the images. In addition, the information from previous frame is available. Given this input, embodiments of the present disclosure are directed to a method that includes the following steps:

A. Tracking keypoints: finding a set of corresponding features (keypoints) in a current stereo images pair with strong links to a previous images pair;

B. Estimation: generating rectification transformations based on the estimated parameters of the model;

C. Projection distortion minimization: deciding whether to continue with additional iteration of steps A and B above, based on the distortion and the size of the viewing-window in the rectified images.

These steps are described in detail below.

Model

A model according to an embodiment represents planar, epipolar and projective geometry. The model includes three layers, and each layer adds additional geometric implications on top of its preceding layer, as summarized in the table below.

Figure 3:
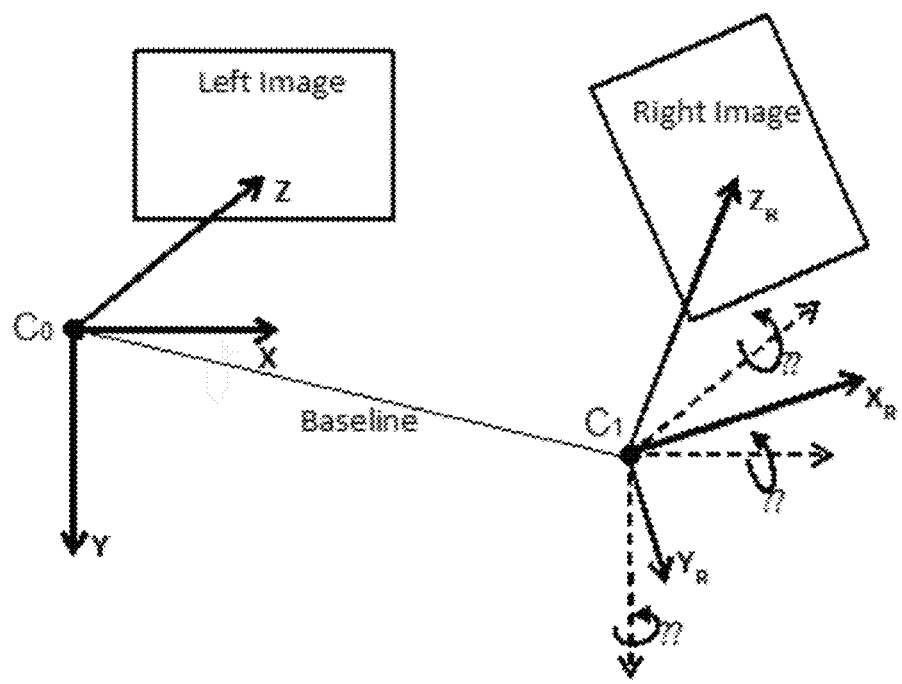
FIG. 3 illustrates the relative orientation and coordinates system, according to an embodiment of the disclosure.

According to an embodiment, the coordinate-system of the left camera is also the coordinate-system of the world. FIG. 3 illustrates the relative orientation and coordinates system, according to an embodiment of the disclosure. The coordinate-system of the world is marked by X-Y-Z axes in the left image of FIG. 3, while the coordinates-system of the right camera is marked $X_r$-$Y_r$-$Z_r$ in the right image. Then, the baseline is set from the center of the left camera $c_0 \triangleq 0$ to the center of the right camera $c_1 \triangleq -R^T t$, where the rotation matrix $R^T$ represents the orientation of the right camera relative to the left camera. Note that rotation R followed by translation t present the mapping of points in the world to the coordinates system of the right camera. This leads to the perspective projection matrices of EQS. (3) and (4), below, of the left and right cameras respectively.

The relative orientation between the left and right cameras can also be parameterized by Euler angles $\theta$, $\psi$, and $\phi$ representing roll, yaw and pitch respectively. According to embodiments, such parameterization is used in EQ. (1) to represent homography. In addition, the formulation in EQ. (1) is based on small angles approximation, where $\theta_H$, $\psi_H$ and $\phi_H$ are the approximated roll, yaw and pitch respectively. Besides rotation, EQ. (1) includes s for zoom-in effect, while $\tilde{f}_0$ and $\tilde{f}_1$ are pre-configured approximated focal lengths of the left and right cameras respectively.

| Parameterization | Representation properties | Geometrical implications |
|---|---|---|
| Layer 1 Homography $H = \begin{pmatrix} 1 & -\theta_H & \tilde{f}_0 \cdot \psi_H \\ \theta_H & 1 & -\tilde{f}_0 \cdot \psi_H \\ -\frac{1}{\tilde{f}_1} \cdot \psi_H & \frac{1}{\tilde{f}_1} \cdot \phi_H & s \end{pmatrix}$ (1) | $\mathcal{P}^2 \to \mathcal{P}^2$ Planar transformation from the left image to the right image; depends on the scene. | Mapping a specific plane, projected on the left image, into its projection on the right image. Particularly designated, in this model, for the plane at infinity. |
| Layer 2 Fundamental matrix $F = \begin{pmatrix} F_{1,1} & F_{1,2} & F_{1,3} \\ F_{2,1} & F_{2,2} & F_{2,3} \\ F_{3,1} & F_{3,2} & F_{3,3} \end{pmatrix}$ (2) | Rank-2 matrix of $3 \times 3$ coefficients, and represents properties of the stereo rig; does not depend on the scene. | Epipolar geometry, mapping all features in one stereo image to their epipolar lines in the second stereo image (and vice versa). |
| Layer 3 Perspective projection matrices $P_0 = K_0[I \vert 0]$ (3) $P_1 = K_1[R \vert t]$ (4) $K_i = \begin{pmatrix} f_i & 0 & 0 \\ 0 & f_i & 0 \\ 0 & 0 & 1 \end{pmatrix}, i=0,1$ $R = \begin{pmatrix} R_{1,1} & R_{1,2} & R_{1,3} \\ R_{2,1} & R_{2,2} & R_{2,3} \\ R_{3,1} & R_{3,2} & R_{3,3} \end{pmatrix}$ $t = \begin{pmatrix} t_{1,1} \\ t_{2,1} \\ t_{3,1} \end{pmatrix}$ | $\mathcal{P}^3 \to \mathcal{P}^2$ Camera projections of left and right cameras. | Projecting a point in the world ($\mathcal{P}^3$) to the image plane ($\mathcal{P}^2$). Triangulation fits a location in the world for corresponding features. |

In EQS. (3) and (4), above, I is a 3×3 identity matrix and 0 is 1×3 zeros vector $$\begin{pmatrix} 0 \\ 0 \\ 0 \end{pmatrix},$$

and the "|" operator in EQS. (3) and (4) a concatenation of the arguments:

$$[I \vert 0] \triangleq \begin{pmatrix} 1 & 0 & 0 & 0 \\ 0 & 1 & 0 & 0 \\ 0 & 0 & 1 & 0 \end{pmatrix},$$

and $$[R \vert t] \triangleq \begin{pmatrix} R_{1,1} & R_{1,2} & R_{1,3} & t_{1,1} \\ R_{2,1} & R_{2,2} & R_{2,3} & t_{2,1} \\ R_{3,1} & R_{3,2} & R_{3,3} & t_{3,1} \end{pmatrix}.$$

According to embodiments, when the parameters of the model's third layer are estimated, then $P_0$ and $P_1$ approximate the projection matrices of the calibrated cameras. This means that the matrices represent a projection from the Euclidean $\mathcal{P}^3$ space ("the world") to the image plane $\mathcal{P}^2$. In that space, the plane at infinity has the canonical form $\Pi_\infty = (0,0,0,1)^T$. Similarly, if the parameters of the first layer are estimated, then H is an approximation of the infinite homography mapping between the views, i.e., the homography that maps $\Pi_\infty$ from the left image to the right. The first and third layers are then related by EQ. (5):

$$H \approx K_1 \cdot R^T \cdot K_0^{-1} \quad (5)$$

According to an embodiment, another relation between the first and the third layers of the model is expressed by EQ. (6):

$$(K_1 \cdot K_1^T)^{-1} \approx H^{-T}(K_0 \cdot K_0^T)^{-1} H^{-1} \quad (6)$$

Eq. (6) is true regardless of the relative orientation R, and only depends on the camera intrinsic parameters $K_0$, $K_1$ and the infinite homography mapping H. Specifically, the intrinsic parameters define the IAC by $\omega \triangleq (K \cdot K^T)^{-1}$. Then, since the absolute conic lies in the plane of infinity, its image is mapped between the views by H, as shown by EQ. (6).

According to an embodiment, the second layer includes the fundamental matrix defined by EQ. (2). The elements $F_{i,j}$ of the matrix F defined by EQ. (2), are estimated in Step 62 of FIG. 6, which illustrates an estimation procedure according to an embodiment, disclosed below. In addition, the elements $f_i$ of the Layer 3 matrix K are floating-point unsigned scalar parameters of a model that are estimated in Step 635 of FIG. 6C, described below. Assuming both layers are estimated, a second layer is related to a third layer by the cross product of EQ. (7):

$$F \approx [K_1 \cdot t]_x \cdot K_1 \cdot R \cdot K_0^{-1} = K_1^{-1} \cdot R \cdot K_0^T \cdot [K_0 \cdot R^T \cdot t]_x \quad (7)$$

Note that by definition the epipole in the right image is given by $e_1 = K_1 \cdot t$. Therefore combining EQS. (7) and (5) gives the relation between the first and second layers, as expressed by EQ. (8):

$$F \approx [e_1]_x \cdot H \qquad (8)$$

Note that the notation $[v]_x$ used in EQS. (7) and (8) refers to a matrix $$[v]_x \triangleq \begin{pmatrix} 0 & -v_3 & v_2 \\ v_3 & 0 & -v_1 \\ -v_2 & v_1 & 0 \end{pmatrix}$$

formed from a vector $v = (v_1, v_2, v_3)^T \in \mathbb{R}^3$, so that for $u \in \mathbb{R}^3$, the cross product $v \times u$ becomes a dot product with the matrix $[v]_x$: $v \times u = [v]_x \cdot u$.

In summary, according to embodiments, the layers of a model are related to each other. Based on the perspective projection matrices (PPMs) defined in the third layer, the fundamental matrix defined in second layer is uniquely determined by EQ. (7) and the homography of the plane at infinity defined in the first layer can be retrieved by EQ. (5). Nevertheless, the layers are separated in the model because their parameters are estimated separately as defined in the following sections.

Tracking Keypoints

According to an embodiment of the disclosure, a procedure for tracking keypoints with correspondence in a stereo sequence is presented below. Using a procedure according to an embodiment, a system can track keypoints for which the correspondence in a current pair of images is strongly linked with correspondence in a previous pair of images. The keypoints are sparsely distributed and attached to features in the images, as described above and illustrated in FIG. 1.

According to an embodiment, an input includes four sets of pairs of matching keypoints:

1. A set of pairs of corresponding-keypoints in the previous stereo images:
$S_{n-1}^{corr} = \{p_{l_{n-1}}^{corr} \leftrightarrow p_{r_{n-1}}^{corr}\}$;

2. A set of pairs of corresponding-keypoints in the current stereo images:
$S_n^{corr} = \{p_{l_n}^{corr} \leftrightarrow p_{r_n}^{corr}\}$;

3. A set of pairs of matched-keypoints in the left camera's adjacent frames:
$S_l^{adj} = \{p_{l_{n-1}}^{adj} \leftrightarrow p_{l_n}^{adj}\}$;

4. A set of pairs of matched-keypoints in the right camera's adjacent frames:
$S_r^{adj} = \{p_{r_{n-1}}^{adj} \leftrightarrow p_{r_n}^{adj}\}$;

where, the vector $p_{l_n}^{corr}$ includes indices of keypoints in frame number n of the left camera that have corresponding keypoints in frame number n of the right camera. The corresponding indices in the right camera are included in $p_{r_n}^{corr}$. Thus, keypoint with index $p_{l_n}^{corr}[i]$ in the left image is matched to keypoint with index $p_{r_n}^{corr}[i]$ in the right image, for every i, where i indexes the pairs in the set $S_n^{corr}$. A similar notation is used here for representing the sets $S_{n-1}^{corr}$, $S_l^{adj}$ and $S_r^{adj}$.

In addition, according to an embodiment, an array of rank-ordered next choice matches is attached to each element of $p_{r_n}^{corr}$, $p_{r_{n-1}}^{corr}$, $p_{r_n}^{adj}$ and $p_{l_n}^{adj}$. These vectors of arrays are represented here by $\tilde{p}_{r_n}^{corr}$, $\tilde{p}_{r_{n-1}}^{corr}$, $\tilde{p}_{r_n}^{adj}$ and $\tilde{p}_{l_n}^{adj}$, respectively. A procedure according to an embodiment also includes a predefined parameter Rank_Ordered_Array_Size (ROA_SIZE) that sets the maximum number of elements in an array.

According to embodiments, there is one ROA for each pair of matching keypoints. Therefore, for example, if $S_n^{corr}$ has M pairs of corresponding keypoints, i.e., keypoints that match between the left and right images, then $\tilde{p}_{r_n}^{corr}$ contains M different ROAs—one ROA for each pair of corresponding points. Therefore $\tilde{p}_{r_n}^{corr}$ has 2 dimensions, where for example $\tilde{p}_{r_n}^{corr}[m][m_{ROA}]$ is the index of element number $m_{ROA}$ in the ROA that belongs to correspondence number m.

Figure 4:
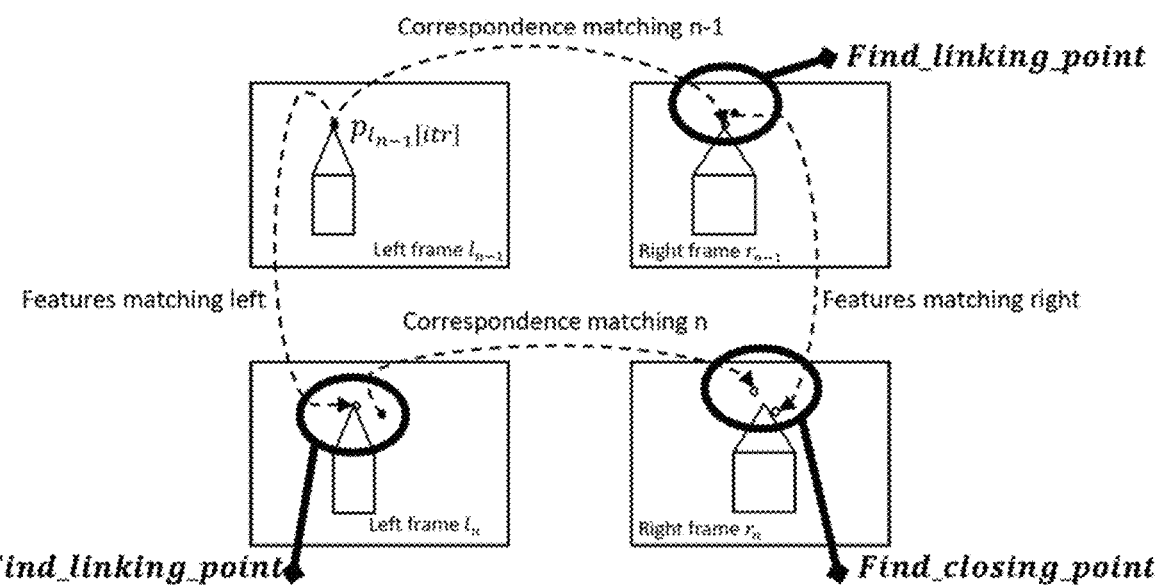
FIG. 4 illustrates tracking keypoints, according to an embodiment of the disclosure.

FIG. 4 illustrates tracking keypoints, according to an embodiment of the disclosure. As illustrated in FIG. 4, tracking is defined here for timestamp n without loss of generality, where $l_{n-1}$, $r_{n-1}$, $l_n$ and $r_n$ depict the relevant images—left and right previous and current stereo frames respectively. Note however, that the images themselves are not part of the input. Corresponding matching is performed for the previous images $l_{n-1}$, $r_{n-1}$ by finding a linking point in the previous right frame $r_{n-1}$, for the left images $l_{n-1}$, $l_n$ by finding a linking point in the current right frame $l_n$, and between the right images $r_{n-1}$, $r_n$ and the current images $l_n$, $r_n$ by finding a closing point in the current right frame $r_n$.

Figure 5A:
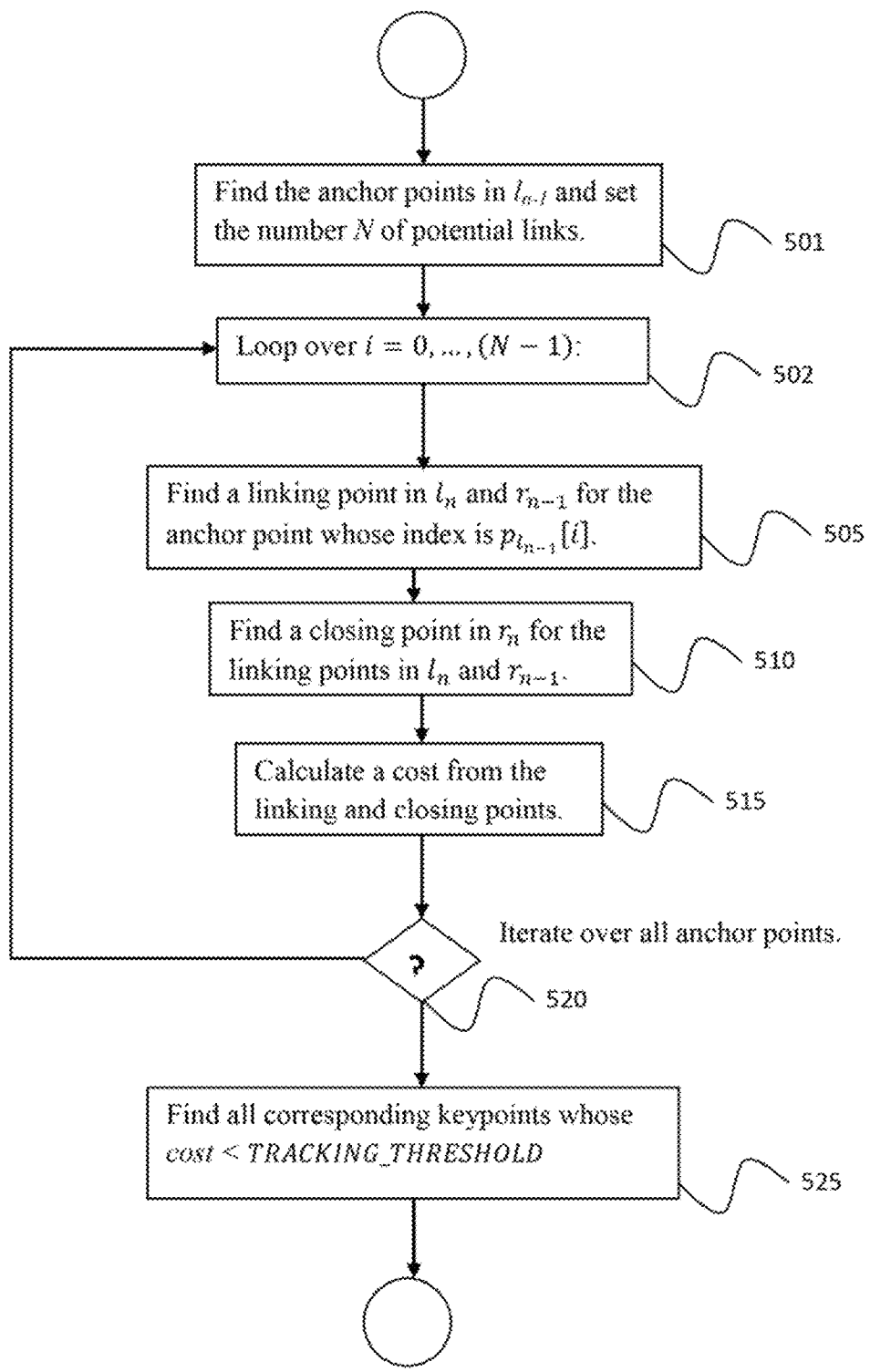
FIG. 5A is a flow chart of a method of tracking keypoints, according to an embodiment of the disclosure.
Figure 5B:
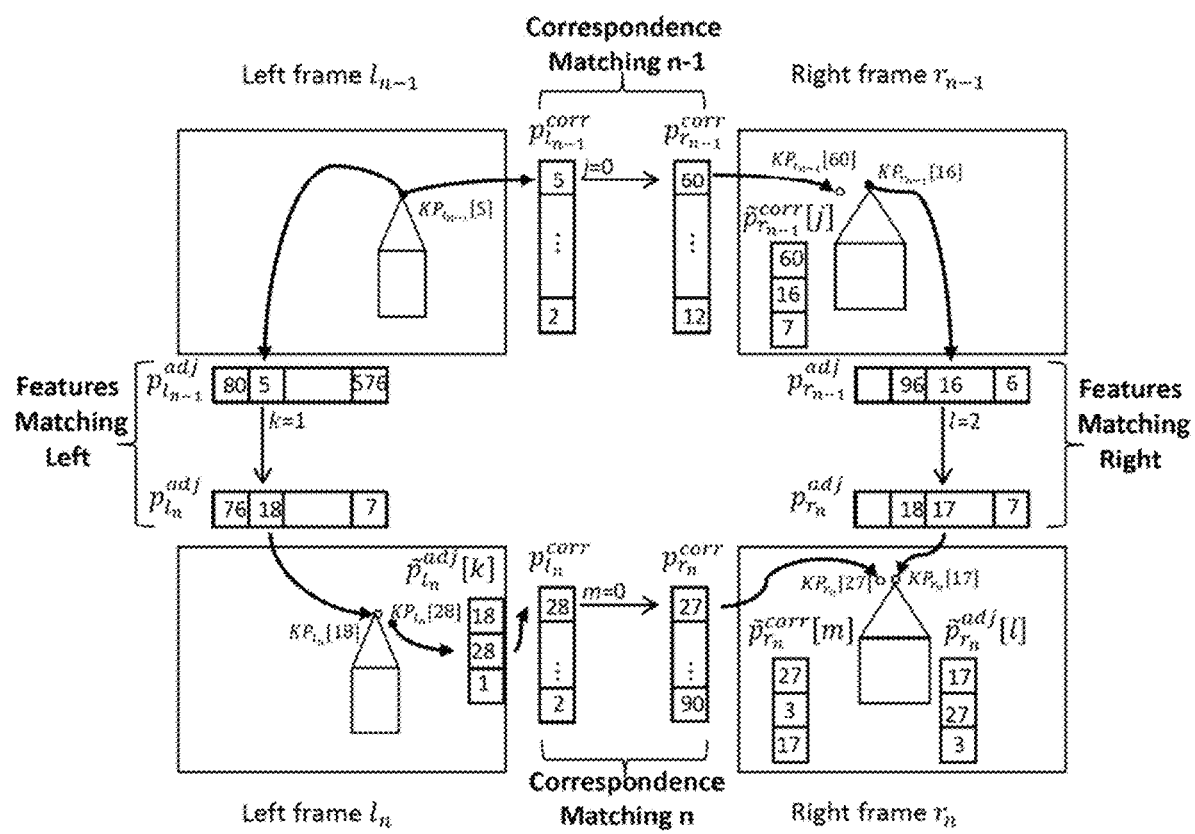
FIG. 5B illustrates an example of finding linking and closing points using vectors of indices and ROAs, according to an embodiment of the disclosure.

An algorithm according to an embodiment includes of the following steps, with reference to the flowchart of FIG. 5A and the diagram of FIG. 5B. The inputs to the algorithm are the parameter ROA_SIZE, the sets $S_n^{corr}$, $S_{n-1}^{corr}$, $S_l^{adj}$ and $S_r^{adj}$, and the vectors $\tilde{p}_{r_n}^{corr}$, $\tilde{p}_{r_{n-1}}^{corr}$, $\tilde{p}_{r_n}^{adj}$ and $\tilde{p}_{l_n}^{adj}$. FIG. 5B illustrates an example for a single iteration i for finding linking and closing points using vectors of indices and ROAs. In this example, ROA_SIZE is set to 3 and a procedure finds two linking points $KP_{l_n}[28]$ and $KP_{r_{n-1}}[16]$, which means that in this example, the keypoint-indices 18 and 60 do not appear in $p_{l_n}^{corr}$ and $p_{r_{n-1}}^{adj}$ respectively. Also in this example, a closing point exists for $l_{ROA} = 2$ and $m_{ROA} = 3$.

Step 501: Find the anchor points in $l_{n-1}$.

An anchor point is any keypoint in $l_{n-1}$ that has a corresponding keypoint in $r_{n-1}$ and a matching keypoint in the adjacent frame $l_n$. Here, $p_{l_{n-1}}$ denotes a vector of the result indices of anchor points:

$$p_{l_{n-1}} \triangleq p_{l_{n-1}}^{corr} \cap p_{l_{n-1}}^{adj}. \qquad (9)$$

Then, set the number of potential links: $N = \text{size}(p_{l_{n-1}})$.

Step 502: In a loop over $i = 0, \ldots, (N-1)$, the following steps are performed.

Step 505: Find a linking point in $l_n$ and $r_{n-1}$ for the anchor point whose index is $p_{l_{n-1}}[i]$, where the linking point in $l_n$ is the keypoint in $l_n$ that corresponds to the keypoint in $l_{n-1}$, and the linking point in $r_{n-1}$ is the keypoint in $r_{n-1}$ that corresponds to the keypoint in $l_{n-1}$.

Let j and k be the indices in the intersection of EQ. (9) such that $$p_{l_{n-1}}[i] = p_{l_{n-1}}^{corr}[j] = p_{l_{n-1}}^{adj}[k].$$

Then, find the linking point in $r_{n-1}$:

$$(l, j_{ROA}) = \text{Find\_linking\_point}(p_{r_{n-1}}^{adj}, \tilde{p}_{r_{n-1}}^{corr}[j]), \qquad (10)$$

If $j_{ROA} <$ ROA_SIZE, the linking point exists, and $p_{r_{n-1}}^{adj}[l] = \tilde{p}_{r_{n-1}}^{corr}[j][j_{ROA}]$. This is illustrated in FIG. 5B by the label "Correspondence Matching n−1".

Next, find the linking point in $l_n$:

$$(m, k_{ROA}) = \text{Find\_linking\_point}(p_{l_n}^{corr}, \tilde{p}_{l_n}^{adj}[k]). \qquad (11)$$

If $k_{ROA} <$ ROA_SIZE, the linking point exists, and $p_{l_n}^{corr}[m] = \tilde{p}_{l_n}^{adj}[k][k_{ROA}]$. This is illustrated in FIG. 5B by the label "Features Matching Left".

Step 510 Find a closing point in $r_n$, where the closing point in $r_n$ is the keypoint in $r_n$ that corresponds to the linking point in $l_n$ and the linking point in $r_{n-1}$.

If both linking points in EQS. (10) and (11) exist then:
Find the closing point in $r_n$:

$$(m_{ROA}, l_{ROA}) = \text{Find\_closing\_point}(\tilde{p}_{r_n}^{corr}[m], \tilde{p}_{r_n}^{adj}[l]). \quad (12)$$

This is illustrated in FIG. 5B by the labels "Features Matching Right" and "Correspondence Matching n".

Step 515: Calculate a cost:

$$\text{cost} \triangleq \alpha_1 \|KP_{l_n}[p_{l_n}^{adj}[k]] - KP_{l_n}[p_{l_n}^{corr}[m]]\|$$

$$+ \alpha_2 \|KP_{r_{n-1}}[p_{r_{n-1}}^{corr}[j]] - KP_{r_{n-1}}[p_{r_{n-1}}^{adj}[l]]\|$$

$$+ \alpha_3 \|KP_{r_n}[\tilde{p}_{r_n}^{corr}[m][m_{ROA}]] - KP_{r_n}[\tilde{p}_{r_n}^{adj}[l][l_{ROA}]]\| \quad (13)$$

where $KP_{l_n}[\ ]$, $KP_{r_{n-1}}[\ ]$, and $KP[\ ]$ represent the actual coordinates of the keypoints, and $\alpha_1$, $\alpha_2$, and $\alpha_3$ are predetermined weighting parameters. Exemplary choices for $\alpha_1$, $\alpha_2$, and $\alpha_3$ are $\alpha_1 = \alpha_2 = \alpha_3 = \frac{1}{3}$. Note that the terms p in EQS. (10)-(13) refer to indices in lists of keypoints, so that to calculate the cost in EQ. (13), their actual x, y coordinates in the image need to be retrieved.

Step 520: Goto step 502 and repeat steps 505, 510 and 515

Step 525: Find the group $S^{corr}$ that contains all the corresponding keypoints for which the cost in (13) is below the configurable threshold TRACKING_THRESHOLD:

$$S^{corr} = \left\{ \begin{array}{c} KP_{l_n}[p_{l_n}^{corr}[m]] \leftrightarrow KP_{r_n}[\tilde{p}_{r_n}^{corr}[m][m_{ROA}]] \\ |\text{cost}(m) < \text{TRACKING\_THRESHOLD} \end{array} \right\}$$

A procedure according to an embodiment (i, $i_{ROA}$)=Find_linking_point(p, $\tilde{p}_{source}$ [ROA]) can be defined as follows:

```
Input
  p: a vector of indices;
  p̃_source[ROA]: a rank-ordered array (ROA) of source indices.
Initialize:
  is_match_found = FALSE;
  index_in_ROA = 0.
While is_match_found == FALSE && index_in_ROA < ROA_SIZE Do
  If p̃_source[index_in_ROA] ∈ p Then;
    Set i_ROA = index_in_ROA
    Set i to be the index such that p[i] == p̃_source[i_ROA]
    Set is_match_found = TRUE
  Else:
    index_in_ROA += 1.
Return i and i_ROA
```

A procedure according to an embodiment ($i_{ROA}^1$, $i_{ROA}^2$) =Find_closing_point($\tilde{p}_{ROA}^1$, $\tilde{p}_{ROA}^2$) can be defined as follows:

```
Input
  p̃_ROA^1, p̃_ROA^2 : two rank-ordered arrays (ROA);
  ROA_Permutations_LUT: Configurable permutations table.
Initialize
  is_match_found = FALSE;
  index_in_ROA1 = 0, index_in_ROA2 = 0, index_in_LUT = 0.
While is_match_found == FALSE && index_in_LUT < LUT_SIZE Do
  If p̃_ROA^1[index_in_ROA1] == p̃_ROA^2[index_in_ROA2] then
    Set i_ROA^1 = index_in_ROA1, i_ROA^2 = index_in_ROA2;
    Set is_match_found = TRUE;
  Else
    index_in_ROA1 = ROA_Permutations_LUT[index_in_LUT][1];
    index_in_ROA2 = ROA_Permutations_LUT[index_in_LUT][2];
    index_in_LUT += 1;
Return i_ROA^1 and i_ROA^2.
```

A procedure according to an embodiment of the disclosure takes a frame-by-frame feature tracking approach, and is efficient in terms of computations since it does not require any mapping and estimation of 3D points, but rather exploits short-term stereo correspondence information between adjacent frames. This allows reliable estimation of rectification transforms with low complexity, as presented in the next section.

Estimation

Figure 6:
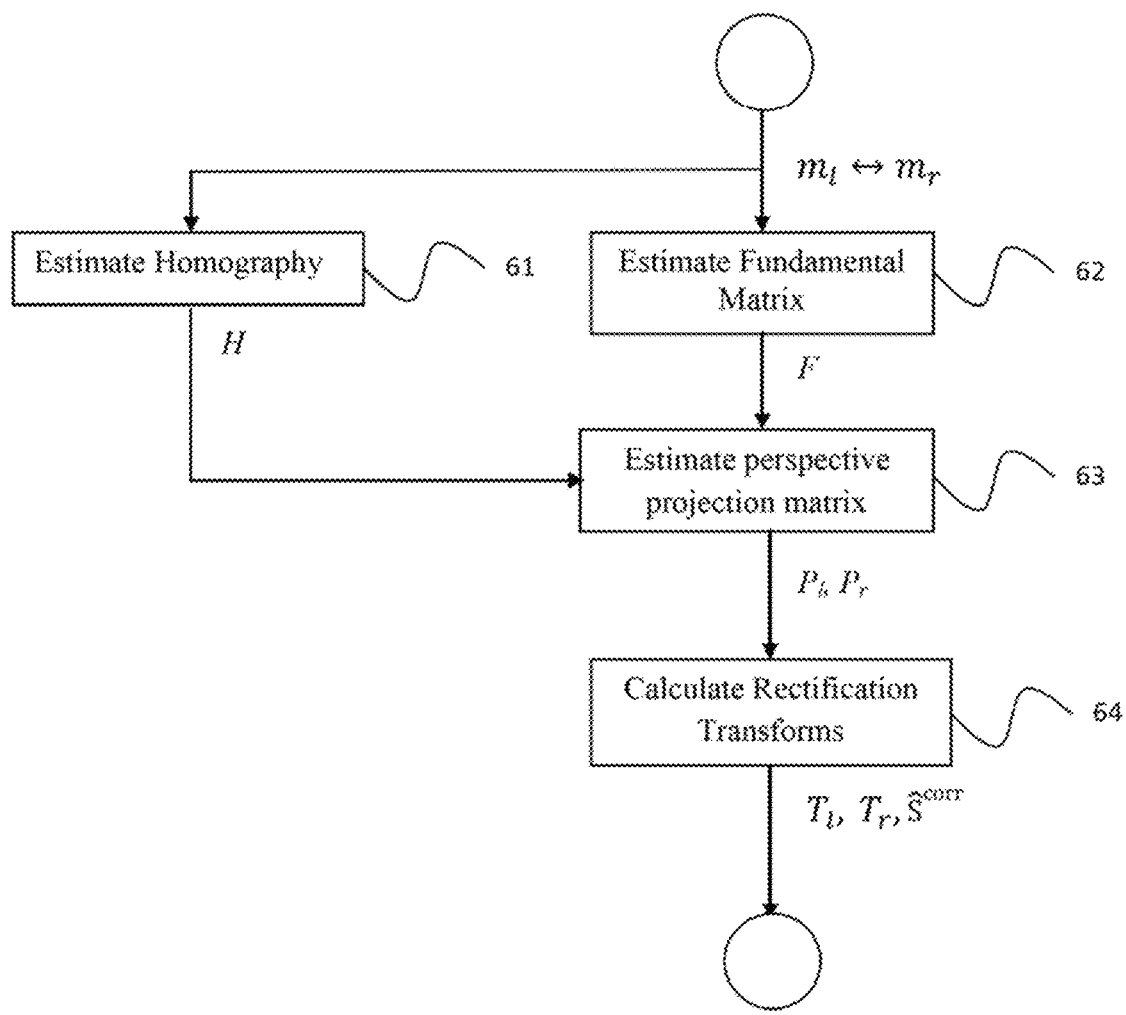
FIG. 6 is a flow chart of an estimation process, according to an embodiment of the disclosure.

A method according to an embodiment for estimating rectification transformations is described in this section, and illustrated in the flowchart of FIG. 6. A method according to an embodiment uses as parameterization a model as defined above, represented by the homography of EQ. (1), the fundamental matrix of EQ. (2) and the PPMs of EQS. (3) and (4). A method according to an embodiment estimates the fundamental matrix, then applies factorization to retrieve the PPMs, and finally calculates the rectification transformations based on the PPMs. According to an embodiment, the homography and the IAC are incorporated into an estimation process for robustness. The homography estimation is described in Step 61 of FIG. 6, and the IAC, as defined by EQ. (6), is retrieved in Step 63 by estimating $K_0$ and $K_1$.

The input to an estimation method according to an embodiment includes a set of pairs of corresponding keypoints, denoted here by $S^{corr} = \{m_l \leftrightarrow m_r\}$, where $m_l \in \mathbb{R}^{3 \times K}$ and $m_r \in \mathbb{R}^{3 \times K}$ are the homogeneous coordinates of K matching keypoints in the left and right images respectively. These keypoints in the 2D coordinate system of the left and right images, respectively, are represented by vectors $x_l$, $y_l$, $x_r$, $x_l \in \mathbb{R}^{1 \times K}$, where all x coordinates are in one vector, and all y coordinates are in another vector. Thus, a corresponding pair with index i, represents a match of keypoints with coordinates ($x_l$, $y_l$) in the left image and coordinates ($x_r$, $y_r$) in the right image:

$$x_l = x_l[i] = m_l[i,1], y_l = y_l[i] = m_l[i,2], m_l[i,3] = 1$$

$$x_r = x_r[i] = m_r[i,1], y_r = y_r[i] = m_r[i,2], m_r[i,3] = 1$$

The output of an estimation method according to an embodiment includes the transformations $T_l$ and $T_r$ that rectify the left and right images respectively, and a subset of the inliers $\hat{S}^{corr} \subseteq S^{corr}$. In general, the set of inliers $\hat{S}^{corr}$, together with the estimated model parameters, can be used in a refinement stage, as part of any designated apparatus that detects features and finds corresponding keypoints, as described above.

In the following, $S^{corr}$ is an output of a tracking procedure according to an embodiment, and contains corresponding keypoints between the current left and right frames, while $S^{rich}$ is an output of an enrichment procedure according to an embodiment, to be described below, that contains corresponding keypoints that were found in previous left and right frames. In a first iteration $S^{rich}$ is empty. However, when an iteration fails, then an enrichment procedure is invoked, which prepares $S^{rich}$ for the next iteration. A fundamental matrix estimation procedure according to an embodiment, described with reference to step 62, below, uses $S^{corr} \cup S^{rich}$, so in that step, correspondences from both groups are treated the same way. However, $S^{rich}$ is not used to estimate a homography matrix, described with reference to step 61, below. This feature of adding correspondences from past correspondences, maybe even a different scene, is applicable only for estimating a fundamental matrix model and not a homography model. This because a fundamental matrix represents properties of the stereo-rig, which is not dependent on the actual scene in front of the cameras, whereas a homography matrix represents a transformation of the projected scene from one view to another, and therefore depends on the scene.

An algorithm according to an embodiment includes of the following steps, with reference to the flowchart of FIG. 6. The outputs of the algorithm are the parameters H, F, $P_0$, and $P_1$ defined above with respect to a model according to an embodiments, and the inputs are the sets of pairs of keypoints $S^{corr}$ and $S^{rich}$.

Step 61: Estimate the homography matrix H.

The vector of the parameters $c=(\phi_H, \psi_H, \theta_H, s)^T$ used to define the homography matrix H can be estimated from the K matching keypoints $S^{corr}$. The estimated homography matrix H should map the homogeneous coordinates $m_l$ to $m_r$. This mapping, when looking at a single pair of matching keypoints, yields EQS. (14), with the scalar-functions $f_u$, $f_v$ and g, that define an estimate of the keypoint coordinates in the right image $\hat{x}_r$ and $\hat{y}_r$:

$$f_u(c) \triangleq x_l - y_l \cdot c[3] + f \cdot c[2], \tag{14}$$

$$f_v(c) \triangleq x_l \cdot c[3] + y_l - f \cdot c[1],$$

$$g(c) \triangleq -\frac{1}{f} \cdot x_l \cdot c[2] + \frac{1}{f} \cdot y_l \cdot c[1] + c[4],$$

$$\hat{x}_r = \frac{f_u(c)}{g(c)} \text{ and } \hat{y}_r = \frac{f_v(c)}{g(c)}.$$

Accordingly, applying (14) on all K matching pairs derives the vectors $\hat{x}_r$ and $\hat{y}_r$. Then, the following non-linear functional is defined, using the known values of x, and y, from the K matching keypoints $S^{corr}$:

$$\operatorname*{argmin}_c \|\hat{x}_r(c) - x_r\|_{l_2}^2 + \|\hat{y}_r(c) - y_r\|_{l_2}^2 \tag{15}$$

The following steps describe iterative Newton's method for solving the optimization in EQ. (15), with reference to the steps of the flowchart of FIG. 6A. Here $\Delta e \in \mathbb{R}^{1 \times 2K}$ denotes the concatenation of the errors $(\hat{x}_r(c) - x_r)$ and $(\hat{y}_r(c) - y_r)$.

Step 611: Initialize: c=zero vector.

Step 613: Calculate Jacobian matrix J: The Jacobian J is the derivate of a function that maps the given keypoints in the left image $$\begin{pmatrix} x_{l_i} \\ y_{l_i} \end{pmatrix},$$

i=1, ..., K to their matching keypoints in the right image $$\begin{pmatrix} x_{r_i} \\ y_{r_i} \end{pmatrix}$$

where K is the number of matching keypoints, i.e. the measures in this optimization. The function is a vector function $\mathbb{R}^{2K} \to \mathbb{R}^{2K}$ with four parameters $\phi_H, \psi_H, \theta_H$, s, the Jacobian is a 4×2K matrix J with 2K rows and 4 columns, and $J^T \cdot J$ is a 4×4 matrix.

Step 614: Solve $$d = J^T \cdot \Delta c$$

$$A = J^T J$$

$$\downarrow$$

$$\Delta c = A^{-1} \cdot d$$

Step 615: If the stopping condition ($\Delta c \ll c$) is satisfied, Then Break

Step 616: Else {update c+=$\Delta c$; Continue.}

Step 62 of FIG. 6: Estimate the fundamental matrix.

The fundamental matrix of EQ. (2) is estimated from K matching keypoints $S^{corr} \cup S^{rich}$. The estimated parameters should form a rank-2 matrix that maps each keypoint $m_r(i)$ to its epipolar line in the left image $F_{m_r}$:

$$\forall i \ m_l(i)^T \cdot F \cdot m_r(i) = 0.$$

Figure 6B:
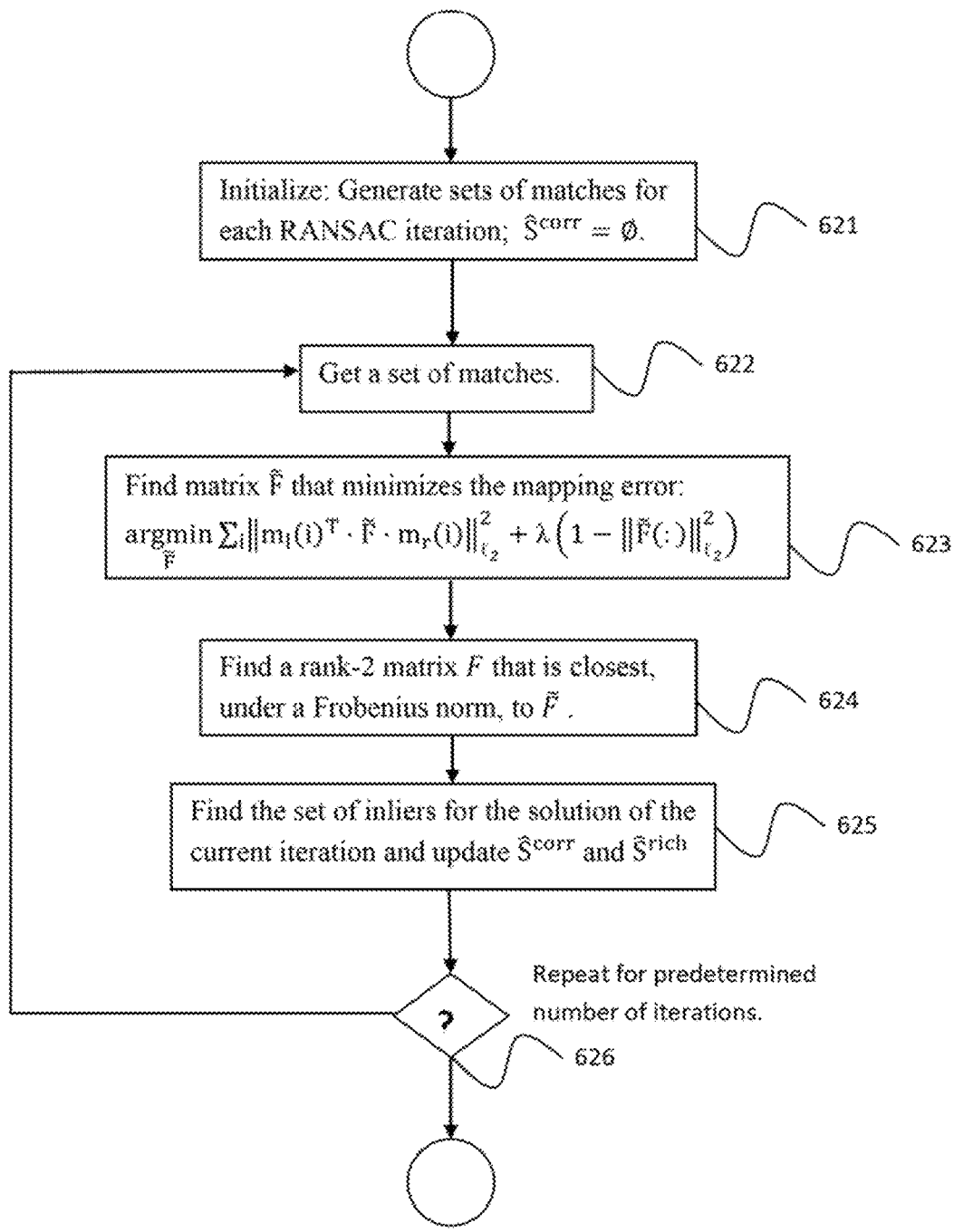
FIG. 6B is a flow chart of a method of estimating the fundamental matrix, according to an embodiment of the disclosure.
Figure 6C:
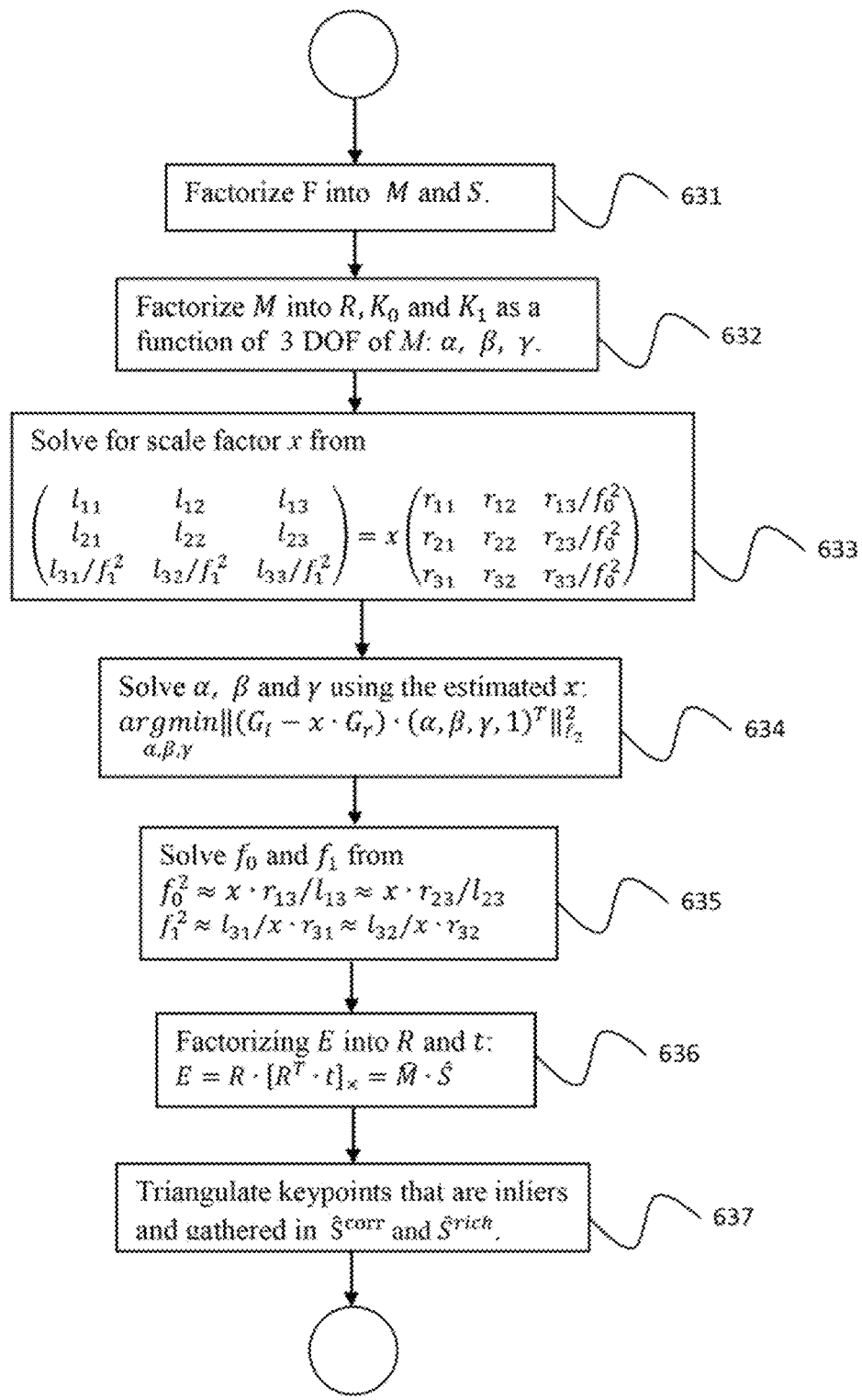
FIG. 6C is a flow chart of a method of estimating the perspective projection matrices, according to an embodiment of the disclosure.

Therefore, an estimation according to an embodiment includes two steps as described below. In a first step, a matrix $\tilde{F}$ is found, which minimizes the mapping error. Next, the estimated F is constrained to be a rank-2 matrix that is closest to $\tilde{F}$. These steps can be incorporated into a RANSAC framework which provides the basic set of inliers $\hat{S}^{corr}$ and $\hat{S}^{rich}$, as described below, with reference to the steps of the flowchart of FIG. 6B.

Step 621: RANSAC initialization:

Generate sets of 8 matches for each RANSAC iteration, one match for each degree of freedom in the fundamental matrix. Note that this number of matches is configurable, and can be any number>=8, such as 16 or 32.

In addition, initialize the set of inliers:

$\hat{S}^{corr} = \emptyset$ and $\hat{S}^{rich} = \emptyset$.

where, $\hat{S}^{corr}$ is the group of inliers within $S^{corr}$ and $\hat{S}^{rich}$ is the group of inliers within $S^{rich}$.

RANSAC Iterations:

Step 622: Get a set of 8 matches;

Step 623: Minimize the mapping error:

$$\operatorname*{argmin}_{\tilde{F}} \sum_i \|m_l(i)^T \cdot \tilde{F} \cdot m_r(i)\|_{l_2}^2 + \lambda(1 - \|\tilde{F}(:)\|_{l_2}^2) \tag{16}$$

where, $m_l(i)^T$ and $m_r(i)$ are the RANSAC matches, and i goes over all matches, $\lambda$ is a regularization parameter and $\tilde{F}(:)$ is the vector representation of the matrix $\tilde{F}$. The optimization in EQ. (16) has a solution based on eigenvalue extraction.

Step 624: Impose rank-2 constraint by finding a rank-2 matrix F that is closest, under a Frobenius norm, to the optimal solution of EQ. (16), by performing an SVD of $\tilde{F}$.

Step 625: Find the set of inliers for the solution of the current iteration and update $\hat{S}^{corr}$ and $\hat{S}^{rich}$ accordingly.

Step 626: Repeat steps 622 to 625. A stopping condition according to an embodiment is performing a predetermined number of iterations. An exemplary, non-limiting number of iterations is 500. The best estimation in terms of number of inliers up to that point is selected.

Step 63 of FIG. 6: Estimate the perspective projection matrices (PPMs).

According to embodiments, the PPMs of EQS. (3) and (4) can be estimated through a factorization of F. Note that F has rank-2, due to step 624, above. Therefore the following factorization exists, into a product of a non-singular matrix M and a skew-symmetric matrix S:

$$F = M \cdot S. \tag{17}$$

EQS. (17) and (7) coincide when:

$$M = K_1^{-T} \cdot R \cdot K_0^T$$

$$S = [K_0 \cdot R^T \cdot t]_x \triangleq [e_0]_x \tag{18}$$

In a present model according to an embodiment, $K_0$=diag ($f_0$, $f_0$, 1) and $K_i$=diag($f_1$, $f_1$, 1). This form of camera-matrices reflects several assumptions regarding the intrinsic parameters of the cameras. Specifically it assumes zero skew, principal point at the center of the image, and a single focal-length for both x and y axes. According to embodiment, under these constraints, the following steps can be used calculate the PPM from the fundamental matrix, and in particular from M and S, with reference to the steps of the flowchart of FIG. 6C:

Step 631: Factorize F into M and S:

According to an embodiment, the matrix S can be determined directly from an SVD of F, where the third singular value equals to zero because F has rank-2:

$$F = UDW^T \text{ where } D \triangleq \text{diag}(d_0, d_1, 0).$$

Specifically the matrix F can be factored by decomposing the expressions in EQ. (17) so that the component S is expressed by $$S = W \cdot Z \cdot W^T \text{ where } Z \triangleq \begin{pmatrix} 0 & -1 & 0 \\ 1 & 0 & 0 \\ 0 & 0 & 0 \end{pmatrix},$$

and the component M has three DOF represented here by $\alpha$, $\beta$ and $\gamma$ and is expressed by $$M \triangleq U \cdot X \cdot B^T \cdot W^T \tag{19}$$

where $$B \triangleq \begin{pmatrix} 0 & 1 & 0 \\ -1 & 0 & 0 \\ 0 & 0 & 1 \end{pmatrix}, X \triangleq \begin{pmatrix} d_0 & 0 & \alpha \\ 0 & d_1 & \beta \\ 0 & 0 & \gamma \end{pmatrix} \text{ and } \begin{array}{l} UDW^T \triangleq SVD(F) \\ D \triangleq \text{diag}(d_0, d_1, 0) \end{array}.$$

The matrix S in the expression above depends only on W from the SVD of F, without any degrees of freedom, while, M in EQ. (19) has three degrees of freedom parametrized by $\alpha$, $\beta$ and $\gamma$.

Step 632: Factorize M into R, $K_0$ and $K_1$ as a function of $\alpha$, $\beta$, $\gamma$:

According to an embodiment, this can be accomplished by substituting M from EQ. (18) into EQ. (19) which yields $$K_1^{-T} \cdot R \cdot K_0^T = x_1 \cdot U \cdot X \cdot B^T \cdot W^T, \tag{19.1}$$

where, since EQ. (18) represents operation on a homogeneous coordinate, the result is only determined up to scale factor that is denoted here by $x_1$. Note that $K_0$ and $K_1$ are diagonal matrices, R is a rotation matrix so $R^T = R^{-1}$ and U and W are orthogonal matrices. Therefore the inverse of EQ. (19.1), up to scale factor, is:

$$K_1 \cdot R \cdot K_0^{-1} = x_2 \cdot U \cdot X^* \cdot B^T \cdot W^T \tag{19.2}$$

where $X^* \triangleq \begin{pmatrix} d_1 \gamma & 0 & 0 \\ 0 & d_0 \gamma & 0 \\ -d_1 \alpha & -d_0 \beta & d_0 d_1 \end{pmatrix}$ Isolating R in EQ. (19.1) yields $R = K_1 \cdot U \cdot X \cdot B^T \cdot W^T \cdot K_0^{-T}$, and isolating R in EQ. (19.2) yields $R = K_1^{-T} \cdot U \cdot X^* \cdot B^T \cdot W^T \cdot K_0$. Comparing these two results yields a following equation that depends only on parameters $f_0$ and $f_1$, i.e. the remaining model parameters R and t do not appear:

$$K_1^2 U X B^T W^T = x U X^* B^T W^T K_0^2.$$

Writing the matrices in the above equation explicitly as function of the parameters $f_0$ and $f_1$ and the unknowns $\alpha$, $\beta$, $\gamma$ and x, yields EQ. (20), $$\begin{pmatrix} l_{11} & l_{12} & l_{13} \\ l_{21} & l_{22} & l_{23} \\ l_{31}/f_1^2 & l_{32}/f_1^2 & l_{33}/f_1^2 \end{pmatrix} = x \begin{pmatrix} r_{11} & r_{12} & r_{13}/f_0^2 \\ r_{21} & r_{22} & r_{23}/f_0^2 \\ r_{31} & r_{32} & r_{33}/f_0^2 \end{pmatrix}, \tag{20}$$

where $$\begin{pmatrix} l_{11} & l_{12} & l_{13} \\ l_{21} & l_{22} & l_{23} \\ l_{31}/f_1^2 & l_{32}/f_1^2 & l_{33}/f_1^2 \end{pmatrix} \triangleq \frac{1}{f_1^2} K_1^2 U X B^T W^T, \tag{20.1}$$

$$\begin{pmatrix} r_{11} & r_{12} & r_{13}/f_0^2 \\ r_{21} & r_{22} & r_{23}/f_0^2 \\ r_{31} & r_{32} & r_{33}/f_0^2 \end{pmatrix} \triangleq \frac{1}{f_0^2} U X^* B^T W^T K_0^2.$$

According to embodiments, an element-wise comparison of the matrices from both sides of EQ. (20) yields a set of equations that are linear in $f_0^2$, $f_1^2$ but have four additional degrees of freedom parametrized by $\alpha$, $\beta$, $\gamma$ and x. Therefore, after estimating $\alpha$, $\beta$, $\gamma$ and x, the elements $l_{ij}$ and $r_{ij}$ can be calculated by EQ. (20.1) and finally the model parameters $f_0^2$, $f_1^2$ are easily solved by EQ. (21), in the next section.

According to embodiments, to estimate $\alpha$, $\beta$, $\gamma$ and x, the top-left 2×2 sub-matrix that does not depend on $f_0^2$ and $f_1^2$ in both sides of EQ. (20) is used. Based on EQ. (20.1), these left and right 2×2 sub-matrices can be written as linear function of $\alpha$, $\beta$, $\gamma$, denoted by $G_l$ and $G_r$ respectively:

$$\begin{pmatrix} l_{11} \\ l_{12} \\ l_{21} \\ l_{22} \end{pmatrix} \triangleq G_l \cdot \begin{pmatrix} \alpha \\ \beta \\ \gamma \\ 1 \end{pmatrix}, \begin{pmatrix} r_{11} \\ r_{12} \\ r_{21} \\ r_{22} \end{pmatrix} \triangleq G_r \cdot \begin{pmatrix} \alpha \\ \beta \\ \gamma \\ 1 \end{pmatrix}$$

Substituting the elements $U_{ij}$ and $W_{ij}$ of the SVD matrices U and W, as well as the singular values $d_0$ and $d_1$ from EQ. (20.1), the matrices $G_l$ and $G_r$ are written explicitly as:

$$G_l = \begin{pmatrix} U_{11}V_{13} & U_{12}V_{13} & U_{13}V_{13} & d_0 U_{11}V_{11} + d_1 U_{12}V_{12} \\ U_{11}V_{23} & U_{12}V_{23} & U_{13}V_{23} & d_0 U_{11}V_{21} + d_1 U_{12}V_{22} \\ U_{21}V_{13} & U_{22}V_{13} & U_{23}V_{13} & d_0 U_{21}V_{11} + d_1 U_{22}V_{12} \\ U_{21}V_{23} & U_{22}V_{23} & U_{23}V_{23} & d_0 U_{21}V_{21} + d_1 U_{22}V_{22} \end{pmatrix}$$

$$G_r = \begin{pmatrix} -d_1 U_{13}V_{11} & -d_0 U_{13}V_{12} & d_0 U_{12}V_{12} + d_1 U_{11}V_{11} & d_0 d_1 U_{13}V_{13} \\ -d_1 U_{13}V_{21} & -d_0 U_{13}V_{22} & d_0 U_{12}V_{22} + d_1 U_{11}V_{21} & d_0 d_1 U_{13}V_{23} \\ -d_1 U_{23}V_{11} & -d_0 U_{23}V_{12} & d_0 U_{22}V_{12} + d_1 U_{21}V_{11} & d_0 d_1 U_{23}V_{13} \\ -d_1 U_{23}V_{21} & -d_0 U_{23}V_{22} & d_0 U_{22}V_{22} + d_1 U_{21}V_{21} & d_0 d_1 U_{23}V_{23} \end{pmatrix}.$$

Step 633: Solve the scale factor x:

According to an embodiment, for EQ. (20) to have a solution, the constraint $\det(G_l - x G_r) = 0$ must exist. This defines a set of linear equations on the coefficients of the characteristic polynomial.

Step 634: Solve $\alpha$, $\beta$ and $\gamma$:

Using the estimated x, the following linear least squares solution can be derived from EQ. (20):

$$\underset{\alpha,\beta,\gamma}{\operatorname{argmin}} \|(G_l - x \cdot G_r) \cdot (\alpha, \beta, \gamma, 1)^T\|_{\ell_2}^2.$$

Step 635: Solve $f_0$ and $f_1$:

According to an embodiment, by substituting the estimated $\alpha$, $\beta$ and $\gamma$ in EQ. (19), the explicit values of all the coefficients $l_{ij}$ and $r_{ij}$ in EQ. (20) can be derived. Next, $f_0$ and $f_1$ are estimated based on EQ. (20) as follows:

$$f_0^2 \approx x \cdot r_{13}/l_{13} \approx x \cdot r_{23}/l_{23}$$

$$f_1^2 \approx l_{31}/x \cdot r_{31} \approx l_{32}/x \cdot r_{32}, \qquad (21)$$

According to an embodiment, an essential matrix can be extracted from the fundamental matrix using the estimated $f_0$ and $f_1$ from step 2.3 above:

$$E \triangleq K_1^T \cdot F \cdot K_0 \qquad (22)$$

Step 636: Factorizing E into R and t:

According to an embodiment, substituting EQ. (7) into EQ. (22) yields a result $E = R \cdot [R^T t]_\times = \hat{M} \cdot \hat{S}$ where $\hat{M}$ is non-singular matrix and $\hat{S}$ is skew-symmetric. Therefore a procedure similar to a factorization of step 631 above can be applied here, although this time with known and normalized $\hat{f}_0 = 1$ and $\hat{f}_1 = 1$ and as a result $\hat{D} \triangleq \operatorname{diag}(d, d, 0)$.

Step 637: Triangulation:

A triangulation according to an embodiment can be applied on corresponding keypoints that are inliers and gathered in $\hat{S}^{corr} \cup \hat{S}^{rich}$. Then, the set of inliers $S^{inliers}$ consists of these members of $\hat{S}^{corr} \cup \hat{S}^{rich}$ mapped by the triangulation to 3D points that lie in front of the stereo rig. Furthermore, depth information on tracked keypoints, from previous iterations or previous frames, may be exploited to increase the robustness of outliers-rejection. The triangulation error is reported and assists in the validation of the rectification solution as described in the next section.

Step 64 of FIG. 6: Rectifying transformations calculation

A rectifying transformation according to an embodiment can be computed from the estimated PPMs of EQS. (3) and (4). The PPMs model the left and right image-planes as well as the baseline of the stereo rig. To obtain a rectified stereo, these planes should become coplanar and their horizontal axis should be parallel to the baseline. Hence, new rectified PPMs are defined in EQ. (23). These are normalized versions of the cameras of EQS. (3) and (4) that have been rotated upon their center, and their image-planes have become coplanar. In addition, both cameras share the orientation $\tilde{R}$. This orientation is defined below such that the horizontal axis of both cameras is parallel to the baseline.

$$\tilde{p}_0 = K_0[\tilde{R} \mid 0], \quad \tilde{p}_1 = K_0[\tilde{R} \mid \tilde{R} \cdot R^T t] \qquad (23)$$

where, $$\tilde{R} \triangleq \begin{bmatrix} \left(\frac{1}{\|R^T t\|} \cdot R^T t\right)^T \\ (0, 0, 1) \times \left(\frac{1}{\|R^T t\|} \cdot R^T t\right)^T \\ \left(\frac{1}{\|R^T t\|} \cdot R^T t\right)^T \times \left((0, 0, 1) \times \left(\frac{1}{\|R^T t\|} \cdot R^T t\right)^T\right) \end{bmatrix}$$

The transformations $T_l$ and $T_r$ in EQ. (24) map the image-planes of the PPMs EQS. (3) and (4)) respectively to the image-planes of the rectified PPMs in EQ. (23).

$$T_l = K_0 \cdot \tilde{R} \cdot K_0^{-1}, \quad T_r = K_0 \cdot \tilde{R} \cdot R^T \cdot K_1^{-1} \qquad (24)$$

Finally, applying the transformations $T_l$ on the left image and $T_r$ on the right image yields the pair of rectified images.

Projective Distortion Minimization

According to embodiments of the disclosure, projective distortion is reduced in the rectified images, while maintaining a valid view-window. This can be done on at least three levels. In a single frame level, an estimation is repeated in iterations with outliers-rejection and tracking, under the condition that the estimation error declines. If the estimation error is above a threshold, the distortion is too high or the view-window too small, then the frame is skipped. At a scene level, a model according to an embodiment is estimated on informative frames of the scene, with small estimation error, and continuously used and so that it is available for rectifying the less informative frames. At a multi-scene level, a list of corresponding-keypoints for enrichment is maintained, as described in step 745, below. These keypoints and their matches can be incorporated into the correspondence input data in future scenes. This enrichment of the data for estimation is useful when estimating the fundamental matrix in an estimation algorithm of step 62 of FIG. 6.

According to embodiments of the disclosure, the output of refinement is not used in enrichment. Enrichment depends on the inliers of the current iteration and their locations, and for areas that contain small number of inliers to enrich them with correspondences from previous stereo-pairs/scenes, to improve the fundamental matrix estimation. On the other hand, refinement increases the number of inlier-correspondences from the current stereo pair by improving the order of the next-choices and thereby improving the tracking in next iteration, in terms so that more tracked keypoints can be fit to the model.

Figure 7B:
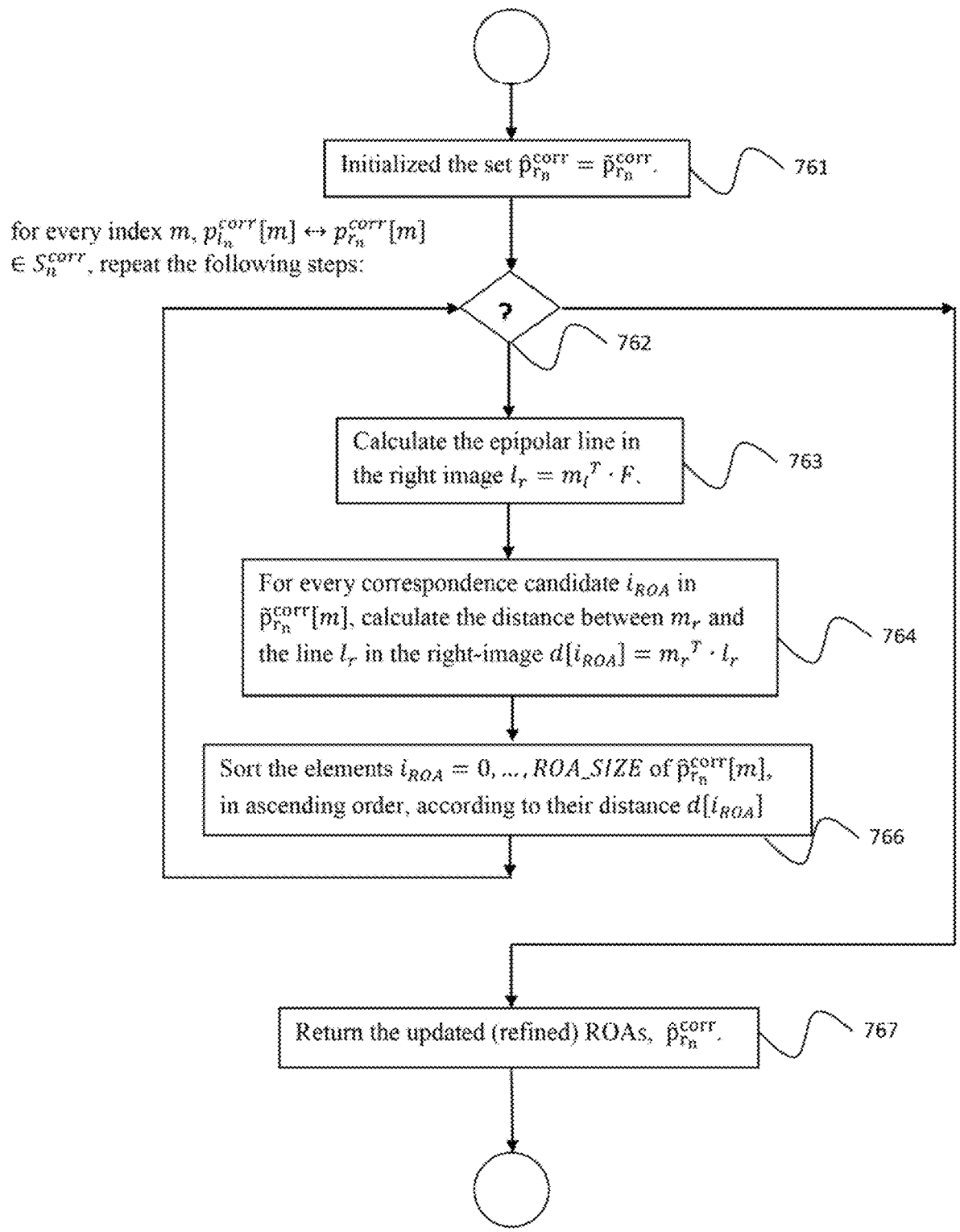
FIG. 7B is a flowchart of a method for refining the correspondence matching in preparation for a next iteration, according to an embodiment of the disclosure.

A framework according to an embodiment for iterative estimation of the rectifying transformations, on sequences of stereo images is described in this section, with reference to FIG. 7. Through a procedure according to an embodiment, a system can control and reduce the projective distortion in the rectified images, while keeping a valid view-window. Given a frame n of an input stereo sequence, FIG. 7 includes the following steps. At step 71, features are matched. This is described above in the Features Matching section. Keypoints are tracked and the rectification transformation is estimated at step 72, which are described above in the Tracking Keypoints section and the Estimation section. At step 73, the distortions are approximated, which are used at step 74 to determine if the stop condition has been satisfied, and at step 75 to determine if the estimated rectification transformation is valid. If the stop condition is satisfied at step 74, and the estimated rectification transformation is determined to be valid at step 75, a rectified frame n is output, otherwise the next frame n+1 is processed. If the stop condition is not satisfied at step 74, the model is refined at step 76, which reduces the estimation error iteratively while increasing the number of inliers, and the model is enriched at step 77, which incorporates high scored matching-keypoints from multiple scenes. An iterative minimization process according to an embodiment returns to step 72 and repeats. Steps 73, 74, 76, 77 and 75 are described below.

Step 73: Distortion approximation

A distortion approximation procedure according to an embodiment determines the following algebraic error and geometrical distortion assessments, which are used by a validation procedure according to an embodiment to produce a binary decision indicating whether or not a rectification result is valid.

$N^{inliers} \triangleq$ Number of inlier correspondences related to the estimated model. It is the size of the group $S^{inliers}$ defined in step 637 of an estimation procedure according to an embodiment. Initially, inliers can be found by a RANSAC estimation of the fundamental matrix, in step 625 of an Estimation procedure. Specifically, the error function used in the data-term in EQ. (16) is:

$$f_{Loss}(m_l, m_r) = \|m_l^T \cdot F \cdot m_r\|_{l_2}^2, \qquad (25)$$

where, $m_l$ and $m_r$ represent a pair of corresponding-keypoints and $f_{Loss}$ measures the distance from the keypoint in the right image to its epipolar line. Consequently, a correspondence is an inlier only if its error function with regard to the estimated matrix F is less than or equal to a configurable threshold, INLIER_ERROR_THRESHOLD, which by default set to one pixel. Moreover, the final group of inliers $S^{inliers}$ includes only correspondences that fit EQ. (22) and its factorization in step 631. Such correspondences can be mapped by triangulation to points that lie in front of the stereo rig.

$Err^{epipolar} \triangleq$ Estimation-error of the fundamental matrix, measured on $S^{inliers}$. The error is the mean distance between keypoints and their epipolar lines, based on EQ. (25):

$$Err^{epipolar} = \frac{1}{N^{inliers}} \sum_{m_l^{(n)} \leftrightarrow m_r^{(n)} \in S^{inliers}} f_{Loss}(m_l^{(n)}, m_r^{(n)}). \qquad (26)$$

$Err^{triangl} \triangleq$ Triangulation error, as measured in step 637 of an Estimation procedure. Specifically, using midpoint triangulation, the mapping of a single pair of corresponding keypoints $m_l$ and $m_r$, involves the calculation of two lines. One line $l_l$ goes from the center of the left-camera, denoted by the vector $c_l = (0\ 0\ 0\ 1)^T$ in homogenous 3D coordinates, to the keypoint $m_l$ on the left-image plane. A second line $l_r$ goes from the center of the right-camera, denoted by $c_r = -R^T t$ in EQ. (4), to the keypoint $m_r$ on the right-image plane. Then, triangulation can map the pair of keypoints to the midpoint between the lines. Therefore, the triangulation error can be defined by the distance between the lines, given by $$d = \|c_l + \lambda_l l_l - c_r - \lambda_r l_r\|,$$

where, the scalar $\lambda_l$ identifies the point on the line $l_l$ that is the closest to the line $l_r$. Similarly, $\lambda_r$ represents the point on $l_r$ that is closest to $l_l$. Finally, the total triangulation error for K inlier-correspondences is:

$$Err^{triangl} = \frac{1}{K} \sum_k d_k. \qquad (27)$$

$Err^{intrinsic} \triangleq$ Estimation error related to the intrinsic parameters $f_0$ and $f_1$ calculated in EQ. (21), as described in step 635 of an estimation procedure. According to EQ. (20) the following identity should exist:

$$(f_0^2 \cdot l_{33}) / (f_1^2 \cdot x \cdot r_{33}) \approx 1.$$

Therefore, the intrinsic estimation error can be defined by—

$$Err^{intrinsic} = \|1 - (f_0^2 \cdot l_{33}) / (f_1^2 \cdot x \cdot r_{33})\|. \qquad (28)$$

$Err^{homog} \triangleq$ Estimation-error of the homography, measured on $S^{corr}$. In each correspondence $m_l \leftrightarrow m_r \in S^{corr}$, the keypoint in the left-image can be mapped by the homography to the right image. Then the error is measured by the mean distance between the mapping results and the corresponding keypoints in the right image:

$$Err^{epipolar} = \frac{1}{N^{corr}} \sum_{m_l^{(n)} \leftrightarrow m_r^{(n)} \in S^{corr}} d_{Euclidean}(H \cdot m_l^{(n)}, m_r^{(n)}),$$

where, the distance function normalizes the coordinates and calculates Euclidean distance by $$d_{Euclidean}(a, b) \triangleq \left\| \frac{1}{a(3)} \cdot a - \frac{1}{b(3)} \cdot b \right\| \quad \forall\, a, b \in P^2. \qquad (29)$$

In EQ. (29), a and b are vectors in a 2-dimensional projective space $P^2$ that represents pixel-coordinates in the image. Therefore these vectors are 3-dimensional vectors of homogeneous coordinates, and should be normalized before the distance is calculated. Dividing each vector by its own $3^{rd}$ coordinate, a(3) and b(3) respectively, normalizes the vectors, and as a result both normalized vectors have "1" at their $3^{rd}$ coordinate.

Dstr $\triangleq$ Projective distortion on each of the rectification transformations $T_l$ and $T_r$, that are calculated in EQ. (24), as described in step 64 of an estimation procedure. The distortion can be evaluated by measuring the rigidity that reflects the shape-preserving properties of the transformations. It can be calculated on an evaluation grid, in the image homogeneous coordinates, denoted by $S_{Grid}^{eval}$. The grid is configurable, but it should include the four corners on the border of the image and the center of the image, where, the center of the image is also the center of the coordinates system denoted by $o_{Grid} = (0\ 0\ 1)^T$. For example, assuming an image width and height of W and H respectively, the basic grid contains $$S_{Grid}^{eval} = \{(-W/2, -H/2, 1)^T, (W/2, -H/2, 1)^T, (W/2, H/2, 1)^T, (-W/2, H/2, 1)^T\}. \qquad (30)$$

Given a transformation T, representing either $T_l$ or $T_r$, and $\tilde{o}_{Grid} = T \cdot (0\ 0\ 1)^T$, which denotes the transformed center, then a distortion can be measured by the following subtraction:

$$Dstr(T) = \max_{m \in S_{Grid}^{eval}} \frac{\|T \cdot m - \tilde{o}_{Grid}\|}{\|m - o_{Grid}\|} - \min_{m \in S_{Grid}^{eval}} \frac{\|T \cdot m - \tilde{o}_{Grid}\|}{\|m - o_{Grid}\|}. \qquad (31)$$

$Size^{viewWindow} \triangleq$ Size of the largest rectangular view window, with valid aspect ratio, that is supported by the transforms $T_l$ and $T_r$ generated in step 64 of an estimation procedure. The window can be found on transformed grid of the image coordinates called $S_{Grid}^{viewWindow}$. The resolution of the grid is configurable, while its pattern is determined according to the aspect ratio. Only symmetric rectangular view windows are supported. Therefore, the grid covers only the upper-right quarter of the image plane. Each point $m \in \triangle^2$ in grid represents a potential window while its norm $\|m\|$ is proportional to the window size. Thus, according to an embodiment, an exhaustive search for the maximal size on valid points yields:

$$Size^{viewWindow} = \max_{m \in S_{Grid}^{viewWindow}} 4 \cdot \|m\|. \qquad (32)$$

$Dstr^{homog} \triangleq$ Distortion in the infinite homography mapping between the views. The distortion can be evaluated by comparing the estimated homography H, represented by EQ. (1), versus the infinite homography mapping, which is extracted from the estimated PPMs according to EQ. (5). Each homography can be applied to the evaluation grid points $S_{Grid}^{eval}$ defined in EQ. (30). Then, the distortion can be defined by the Euclidean distance between the mappings:

$$Dstr^{homog}(H, K_1 \cdot R^T \cdot K_0^{-1}) = \qquad (33)$$

$$\frac{1}{N_{Grid}^{eval}} \cdot \sum_{m \in S_{Grid}^{eval}} d_{Euclidean}(H \cdot m, K_1 \cdot R^T \cdot K_0^{-1} \cdot m),$$

where, the number of points on the grid is $N_{Grid}^{eval}$ and the distance function is EQ. (29).

Step 74: Validation

A procedure according to an embodiment of the disclosure validates the rectification result and checks the stopping condition, using the expressions defined above. The inputs to a validation procedure according to an embodiment include (1) algebraic measures: $N^{inliers}$, $Err^{epipolar}$, $Err^{triangl}$, $Err^{intrinsic}$, $Err^{homog}$; (2) geometric measures: Dstr, $Size^{viewWindow}$, $Dstr^{homog}$; (3) an iterations counter $N^{itr}$; and (4) the set $S^{inliers}$. A validation procedure uses the following configurable parameters: NUMBER_OF_INLIERS_THRESHOLD; EPIPOLAR_ERROR_THRESHOLD; TRIANGULATION_ERROR_THRESHOLD; INTRINSIC_ERROR_THRESHOLD; HOMOGRAPHY_ERROR_THRESHOLD; PROJECTIVE_DISTORTION_THRESHOLD; HOMOGRAPHY_DISTORTION_THRESHOLD; VIEW_NUMBER_THRESHOLD; and NUMBER_OF_ITERATIONSLIMIT.

A validation procedure according to an embodiment includes the following steps, with reference to the flowchart of FIG. 7A.

At step 741, it is determined whether the rectification transforms are valid:

T_is_valid=$N^{inliers}$>NUMBER_OF_INLIERS_THRESHOLD

&&

$Err^{triang}$<TRIANGULATION_ERROR_THRESHOLD

&& $Err^{intrinsic}$<INTRINSIC_ERROR_THRESHOLD

&&

Dstr<PROJECTIVE_DISTORTION_THRESHOLD

&&

$Size^{viewWindow}$>VIEW_WINDOW_THRESHOLD.

At step 742, it is determined whether the homography is valid:

H_is_valid=$Err^{homog}$<HOMOGRAPHY_ERROR_THRESHOLD.

At step 743, it is determines whether the homography is compatible with the PPMs:

F_is_valid=T_is_valid

&& H_is_valid

&& $Dstr^{homog}$<HOMOGRAPHY_DISTORTION_THRESHOLD.

At step 744, the stopping condition is determined:

stop_condition=$N^{itr}$≥NUMBER_OF_ITERATIONS_LIMIT||F_is_valid==true||$Err^{epipolar}(N^{itr})$–$Err^{epipolar}(N^{itr}-1)$>EPIPOLAR_ERROR_THRESHOLD.

At step 745, if stop_condition is true, then invoke Modify_CEA($S^{inliers}$, T_is_valid, τ) procedure and determine whether the rectification is valid:

is_valid=H_is_valid||T_is_valid, otherwise goto steps 76 and 77 to refine and enrich the model, as described below.

Step 75: If is_valid is true, then output rectified frame n, otherwise process the next frame n+1.

At the output of an estimation procedure according to an embodiment, a related group of inliers is found, $S^{inliers}$ as described in step 637. In addition, at the input of a tracking procedure according to an embodiment, a vector of ROAs $\tilde{p}_{r_n}^{corr}$ is defined, as described in steps 510 and 515. If the stopping condition of step 745 is false, then $\tilde{p}_{r_n}^{corr}$ is the input to a refinement procedure that updates the ROAs for next iteration as described in step 76, while $S^{inliers}$ is the input to an enrichment procedure that prepares the enrichment group for next iteration as described in step 77. Otherwise, if the stopping condition is true, the iterative method ends, and it modifies the CEA to add or remove correspondences as defined below. In this case, if the validation test of step 75 passes, the method reaches a valid rectification, otherwise, if a validation test of step 75 fails, the iterative method skips the frame.

A procedure according to an embodiment $CEA_{MN\times K}$=Modify_CEA($S^{inliers}$, is_valid, timestamp) can be defined as follows.

Input

Correspondence Enrichment Array $CEA_{MN\times K}$ to modify;

Correspondence Inliers $S^{inliers}$=$\hat{S}^{corr} \cup \hat{S}^{rich}$.

Current timestamp τ and the boolean validation result is_valid;

If is_valid is false, it means that the rectification failed and the stopping condition is reached, then remove all members of $CEA_{MN\times K}$ for which timestamp==τ;

Else is_valid is true

Remove members of $CEA_{MN\times K}$ that have timestamp==τ but don't belong to $\hat{S}^{rich}$;

Add to $CEA_{MN\times K}$ correspondences from $\hat{S}^{corr}$ with small cost, up to K member per cell;

Return the modified $CEA_{MN\times K}$.

Step 76: Refinement

A refinement procedure according to an embodiment of the disclosure uses the model, as estimated in the current iteration, to refine the correspondence matching in preparation for a next iteration. In particular, a refinement procedure uses the estimated fundamental matrix of EQ. (2) that maps keypoints in $p_{l_n}^{corr}$ to their epipolar lines in the right image $r_n$. According to the epipolar geometry, the corresponding keypoint $p_{r_n}^{corr}[m]$ lies on the epipolar line of $p_{l_n}^{corr}[m]$. Therefore, a refinement stage according to an embodiment updates the rank-ordered arrays so that the correspondences in $\tilde{p}_{r_n}^{corr}[m]$ are reordered by their Euclidian 2D distance to the epipolar line of $p_{l_n}^{corr}[m]$. A refinement procedure according to an embodiment take as input the fundamental matrix F and the corresponding keypoints set $S_n^{corr}=\{p_{l_n}^{corr} \leftrightarrow p_{r_n}^{corr}\}$ with ROAs $\tilde{p}_{r_n}^{corr}$. This procedure is defined below, with reference to the flowchart of FIG. 7B.

At step 761, the set $\hat{p}_{r_n}^{corr}$ is initialized to $\hat{p}_{r_n}^{corr}=\tilde{p}_{r_n}^{corr}$ At step 762, for every index m, $p_{l_n}^{corr}[m] \leftrightarrow p_{r_n}^{corr}[m] \in S_n^{corr}$, the following steps are performed.

Step 763: Letting $m_l \in \triangle^3$ denote the keypoint in the left image $m_l$=$KP_{l_n}(p_{l_n}^{corr}[m])$, calculate the epipolar line in the right image $l_r$=$m_l^T \cdot F$.

Step 764: For every correspondence candidate $i_{ROA}$ in $\tilde{p}_{r_n}^{corr}[m]$, calculate the distance between $m_r$ and the line $l_r$ in the right-image $d[i_{ROA}]=m_r^T \cdot l_r$, where $m_r \in \mathbb{A}^3$ be the keypoint in the right image $m_r = KP_{r_n}(\tilde{p}_{r_n}^{corr}[m][i_{ROA}])$.

Step 766: Sort the elements $i_{ROA}=0, \ldots,$ ROA_SIZE of $\hat{p}_{r_n}^{corr}[m]$, in ascending order, according to their distance $d[i_{ROA}]$, e.g., if $i=\text{argmin}_{i_{ROA}} d[i_{ROA}]$ then $\hat{p}_{r_n}^{corr}[m][0] = \tilde{p}_{r_n}^{corr}[m][i]$.

At step 767: the updated (refined) ROAs, $\hat{p}_{r_n}^{corr}$, are returned.

Step 77: Enrichment

According to an embodiment of the disclosure, a list of corresponding-keypoints for multi-scene enrichment is maintained. Each correspondence in the list includes the following data: (1) coordinates of a keypoint in the left image; (2) coordinates of the corresponding keypoint in the right image; (3) a timestamp indexing the last frame (and scene) where the correspondence was tagged as an inlier; and (4) the tracking cost as calculated in EQ. (13).

According to an embodiment, these correspondences are organized according to a location of a corresponding keypoint in the left image. For this purpose, a pre-defined grid divides the left image into M×N non-overlapping cells. Then, a two-dimensional array of size MN×K stores the correspondences, organized in MN raster-ordered cells, where K is a configurable parameter that limits the number of correspondences per cell. According to an embodiment, this array may be referred to as a correspondence enrichment array (CEA).

Figure 7C:
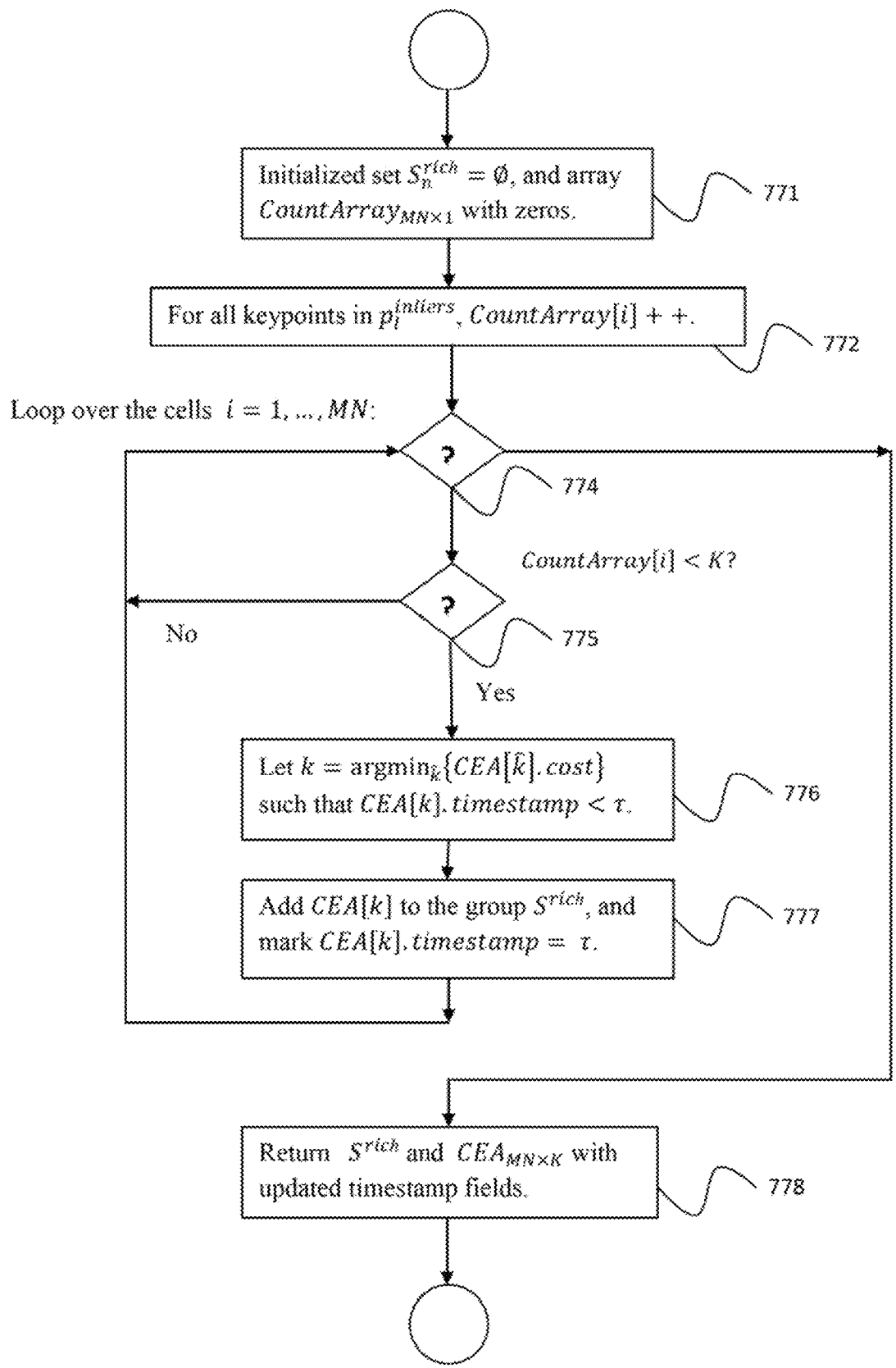
FIG. 7C is a flowchart of a method for enriching the keypoint set, according to an embodiment of the disclosure.

An enrichment procedure according to an embodiment that follows a refinement procedure according to an embodiment, as part of an iterative method illustrated in FIG. 7, is defined below. An enrichment procedure according to an embodiment takes as input the correspondence enrichment array $CEA_{MN \times K}$, the correspondence inliers from the last iteration's estimation $S^{inliers} = \{p_l^{inliers} \leftrightarrow p_r^{inliers}\}$, and the current timestamp τ. This procedure is defined below, with reference to the flowchart of FIG. 7C.

At step 771, the set $S_n^{rich}$ is initialized as $S_n^{rich} = \emptyset$, and array $\text{CountArray}_{MN \times 1}$ of MN counters, one counter per cell, is initialized with zeros.

At step 772, for all keypoints in $p_l^{inliers}$, letting i be the index (raster-order) of a cell in which a keypoint is located, then CountArray[i]++.

At step 774: Loop over the cells i=1, ..., MN:
   If, at step 775, CountArray[i]<K then:
   Step 776: Let $k = \text{argmin}_k(CEA [\hat{k}].cost)$ such that CEA[k].timestamp<τ.
   Step 777: Add CEA[k] to the group $S^{rich}$, and mark CEA[k].timestamp=τ.

At Step 778, Return $S^{rich}$ and $CEA_{MN \times K}$ with updated timestamp fields.

According to an embodiment, as defined above in step 777, an enrichment procedure updates the timestamps of selected members in the correspondence enrichment array. These selected correspondences compose the group $S^{rich}$. Then, when preparing the input for an estimation of the fundamental matrix, $S^{rich}$ is combined with $S^{corr}$ as described with regard to step 62 of an estimation procedure.

Rectification System

Embodiments of the present disclosure can estimate rectifying transformations continuously during the capture of stereo sequences. Systems according to embodiments can model estimated intrinsic parameters of the camera, such as focal length and the stereo rig, such as the baseline and relative orientation. Without such estimation, only approximated values of these parameters are available when capturing the stereo sequences. Using approximations, usually generated by static calibration at the production date, reduces the accuracy of the rectification and increases the complexity of dense matching operations like disparity. Embodiments of the present disclosure can address this issue.

Figure 8:
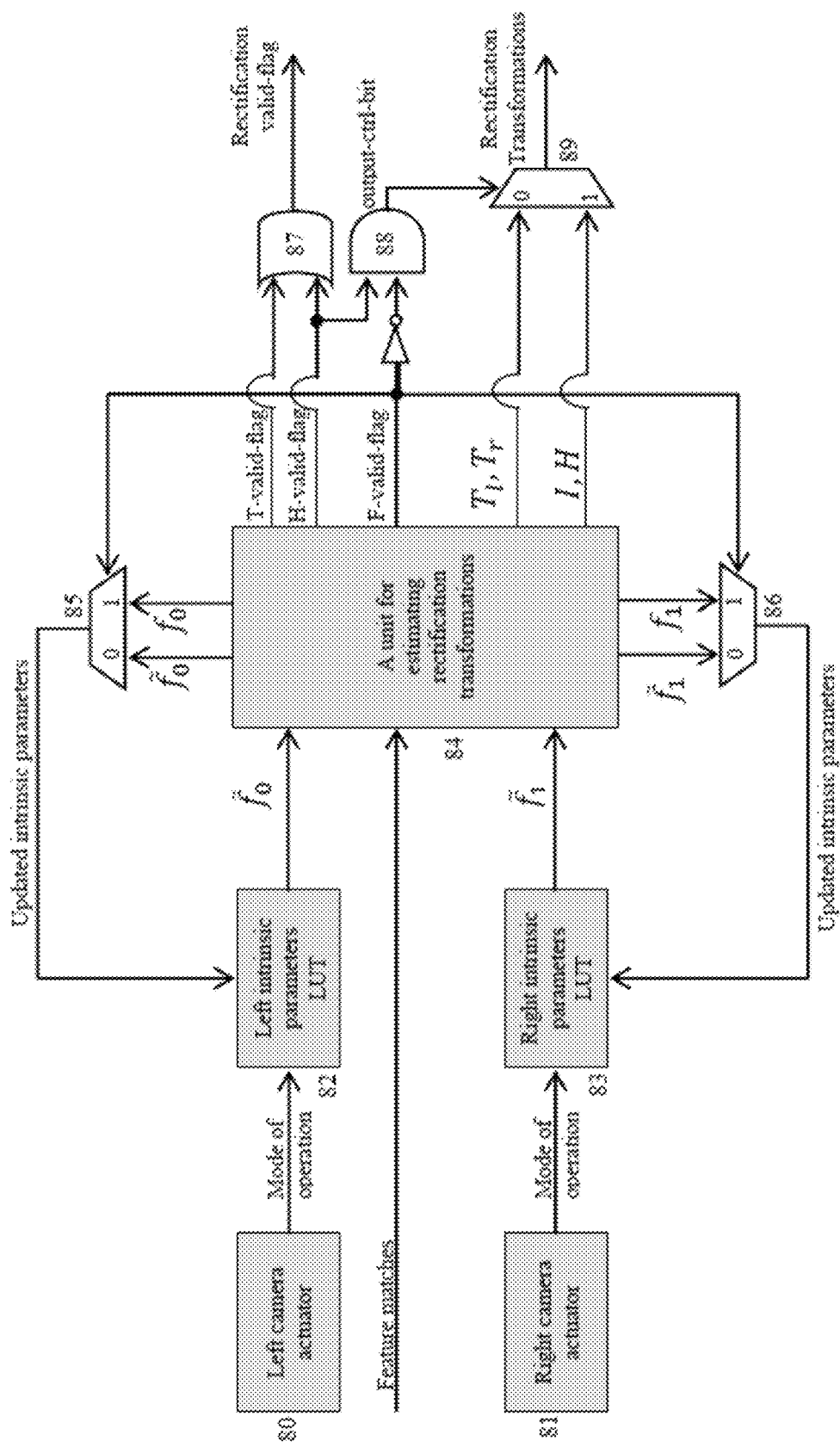
FIG. 8 depicts a system for estimating rectification transformations in video sequences, according to an embodiment of the disclosure.

FIG. 8 illustrates a system according to an embodiment for estimating rectification transformations in video sequences. A system, as shown in FIG. 8, includes two actuators 80, 81—one actuator in each camera of the stereo rig, two look-up tables (LUTs) 82 83, one for each actuator, that are repeatedly updated, and a unit for estimating rectification transformations 84, which performs iterative minimization of the projective distortion as described in previous sections and illustrated in FIG. 7.

According to an embodiment, an actuator is an electromechanical module inside each camera that controls the focus and indirectly changes the focal length. To a great extent, the focal length is correlated with the state of the actuator reported by the camera. Therefore, a system according to an embodiment uses a LUT that maps between actuator-states and their approximated focal length values. The LUTs are referred to as intrinsic parameters LUTs because focal lengths are the intrinsic parameters of the PPM defined by EQS. (3) and (4). The LUTs define the camera matrices $K_0$ and $K_1$, as opposed to the relative orientation R and the baseline t.

According to an embodiment, a mode of operation represents an actuator state that has a corresponding entry in the intrinsic-parameters LUT. For each mode of operation, the left and right LUTs store approximated focal lengths values $\tilde{f}_0$ and $\tilde{f}_1$ respectively.

According to an embodiment, a rectification transformation estimator unit 846 receives the approximated focal lengths through the mechanism described above. Given $\tilde{f}_0$ and $\tilde{f}_1$, unit 84 tracks keypoints as described with respect to FIGS. 5A and 5B and estimates the homography H, using the parametrizations of EQ. (1) as defined in step 61 of an estimation method according to an embodiment. Consequently, at the output of the unit, the validation flag H-valid-flag indicates whether the estimation in step 61 succeeded or failed. In addition, and without any dependency on $\tilde{f}_0$ or $\tilde{f}_1$, unit 86 estimates the fundamental matrix and PPMs, including the intrinsic parameters $f_0$ and $f_1$, as described in steps 62 and 63 of an estimation method, calculates the rectifying transformation $T_l$ and $T_r$, based on the PPMs, as described in step 64 of an estimation method. Consequently, at the output of the unit, the validation flag T-valid-flag indicates whether the calculation in step 64, as well as the preceding estimation in steps 62 and 63, succeeded of failed. Finally, the third validation flag at the output of the unit, F-valid-flag, indicates whether the homography of EQ. (1), estimated in step 61, is compatible with the PPMs of EQS. (3) and (4), estimated in steps 62 and 63. According to an embodiment, a following logic determines an output as a function of the three validation flags.

$$\begin{bmatrix} \text{Rectification} \\ \text{valid-flag} \end{bmatrix}, \begin{bmatrix} \text{Rectification} \\ \text{Transformations} \end{bmatrix} =$$

Output_logic(H-is-valid, T-is-valid, F-is-valid):

If H-valid-flag OR T-valid-flag is positive then,
   Output a positive Rectification valid-flag, meaning that rectification succeeded and the Rectification Transformations are valid.

Else,
  Output a negative Rectification valid-flag, meaning that rectification failed and the Rectification Transformations are not valid. A system according to an embodiment skips to the next frame and the previous rectification transformations (if exit, for current mode of operation) should be used.
If F-valid-flag is positive, meaning that all the estimations succeeded and are compatible with each other, then:
  Update the LUTs with $f_0$ and $f_1$ for future frames and sequences
  Output the Rectification Transformations $T_l$ and $T_r$
If F-valid-flag is negative AND H-valid-flag is positive, meaning that the PPMs estimation failed but the homography succeeded and can be used for rectification, then:
  Output the Rectification Transformations l and H
Else
  Output the Rectification Transformations $T_l$ and $T_r$
A procedure Output_logic is represented in FIG. 8 by the MUXs 85, 86 and 89, AND 88 and OR 87 gates.

Further embodiments of the disclosure may also include modules for correcting lens distortion embodied into the estimation flow, correcting rolling shutter embodied into the estimation flow, possibly based on IMU information, and filtering model parameters over time, for example with an Extended Kalman Filter.

EXAMPLES

Figure 9:
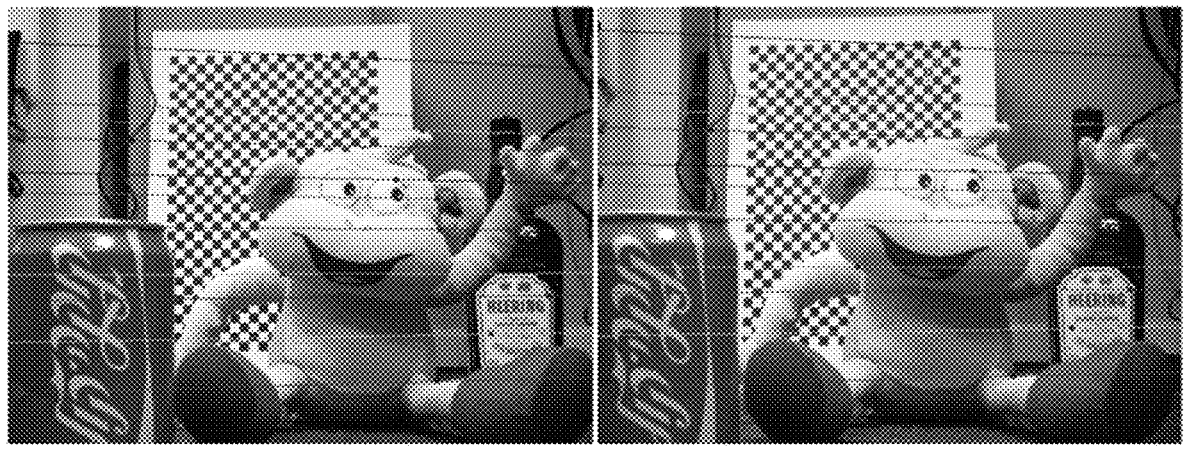
FIG. 9 shows stereo input before rectification in an indoor scene, according to an embodiment of the disclosure.
Figure 10:
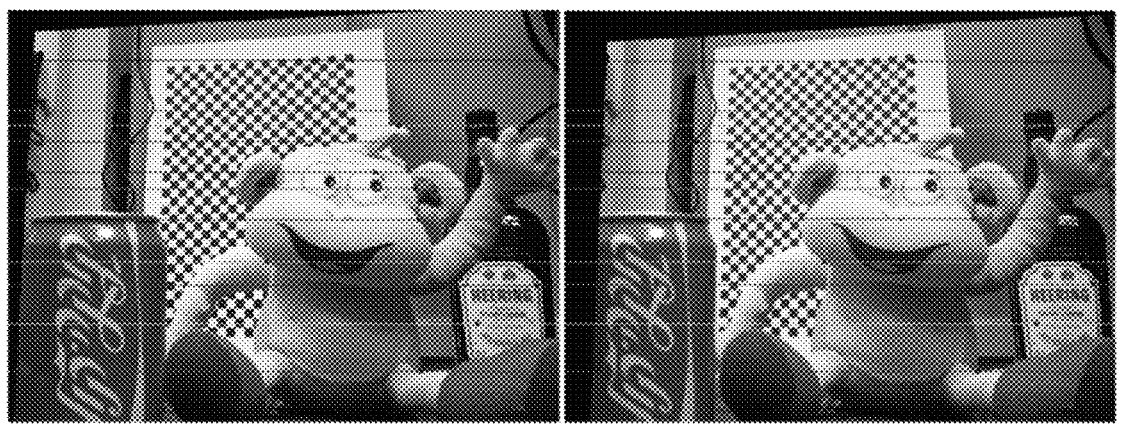
FIG. 10 depicts a projective rectification result with distortion, according to an embodiment of the disclosure.
Figure 12:
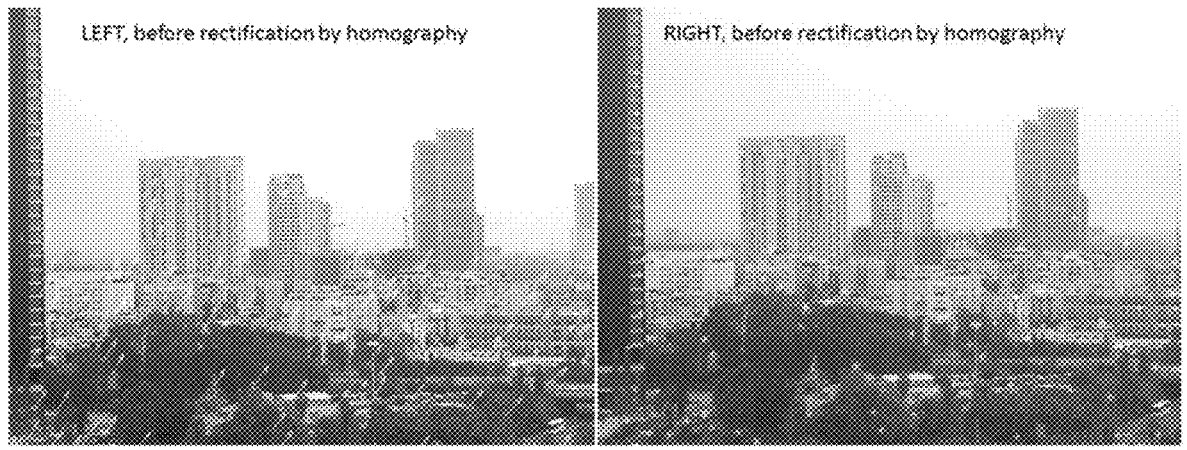
FIG. 12 shows stereo input before rectification in an outdoor scene, according to an embodiment of the disclosure.
Figure 13:
FIG. 13 shows an outdoor scene example with the plane at infinity, according to an embodiment of the disclosure.

FIGS. 9-13 illustrate the rectification of a single pair of left and right images, in a sequence captured by a stereo rig. FIG. 9 shows stereo input before rectification in an indoor scene. FIG. 10 shows a projective rectification result with distortion. FIG. 11 shows an indoor scene example with various depths, according to embodiments of the disclosure. FIG. 12 shows stereo input before rectification in an outdoor scene, according to embodiments of the disclosure. FIG. 13 shows an outdoor scene example with the plane at infinity, according to embodiments of the disclosure.

In FIGS. 9-13, the dark lines represent pairs of conjugate epipolar lines, which illustrate the rectification results. Each epipolar line in the left image has a unique conjugate epipolar line in the right image, while features on an epipolar line in the left image should appear on the conjugate epipolar line in the right image. The images of FIG. 9 are not rectified, therefore conjugate epipolar lines are not collinear and the epipolar lines are not horizontal. FIGS. 10-11 show the results after rectification, therefore in both figures the lines became horizontal and collinear. In FIG. 11, the rectification is performed without distortion, meaning that the structures in the scene are preserved, such as the plane of the chessboard or the bottle.

Effects
  Embodiments of the present disclosure can provide an estimation method that calculates rectifying transformations based on perspective projection matrices (PPMs), which are part of a model according to an embodiment. Therefore, a method according to an embodiment can approximate the Euclidean epipolar rectification which minimizes the distortion. In comparison, other approaches are more likely to suffer from distortion. This includes, for example, estimations based on algebraic error minimization or the quasi-Euclidian rectification.

For example, FIG. 10 shows the distortion results from the typical method for uncalibrated rectification, which is based on algebraic error minimization. In comparison, FIG. 11 shows a result of an embodiment of the disclosure on the same pair of stereo images, where the projective distortion is removed.

In addition, multi-scene enrichment for epipolar geometry and tracking improves the robustness of the estimation. According to embodiment of the present disclosure, enrichment is possible also between different scenes. In comparison, other multi-scene enrichment approaches require significant overlapping area between scenes.

A rectification according to embodiment of the present disclosure is derived from PPM, and therefore remains consistent even over long time periods because the model parameters strictly related to the stereo rig layout. As illustrated in FIGS. 12 and 13, a system according to embodiment of the present disclosure is also consistent in conditions of capturing the horizon, due to the estimation of the infinite homography.

System Implementations

It is to be understood that embodiments of the present disclosure can be implemented in various forms of hardware, software, firmware, special purpose processes, or a combination thereof. In some embodiments, the present disclosure can be implemented in hardware as an application-specific integrated circuit (ASIC), or as a field programmable gate array (FPGA). In other embodiments, the present disclosure can be implemented in software as an application program tangible embodied on a computer readable program storage device. The application program can be uploaded to, and executed by, a machine comprising any suitable architecture.

Figure 14:
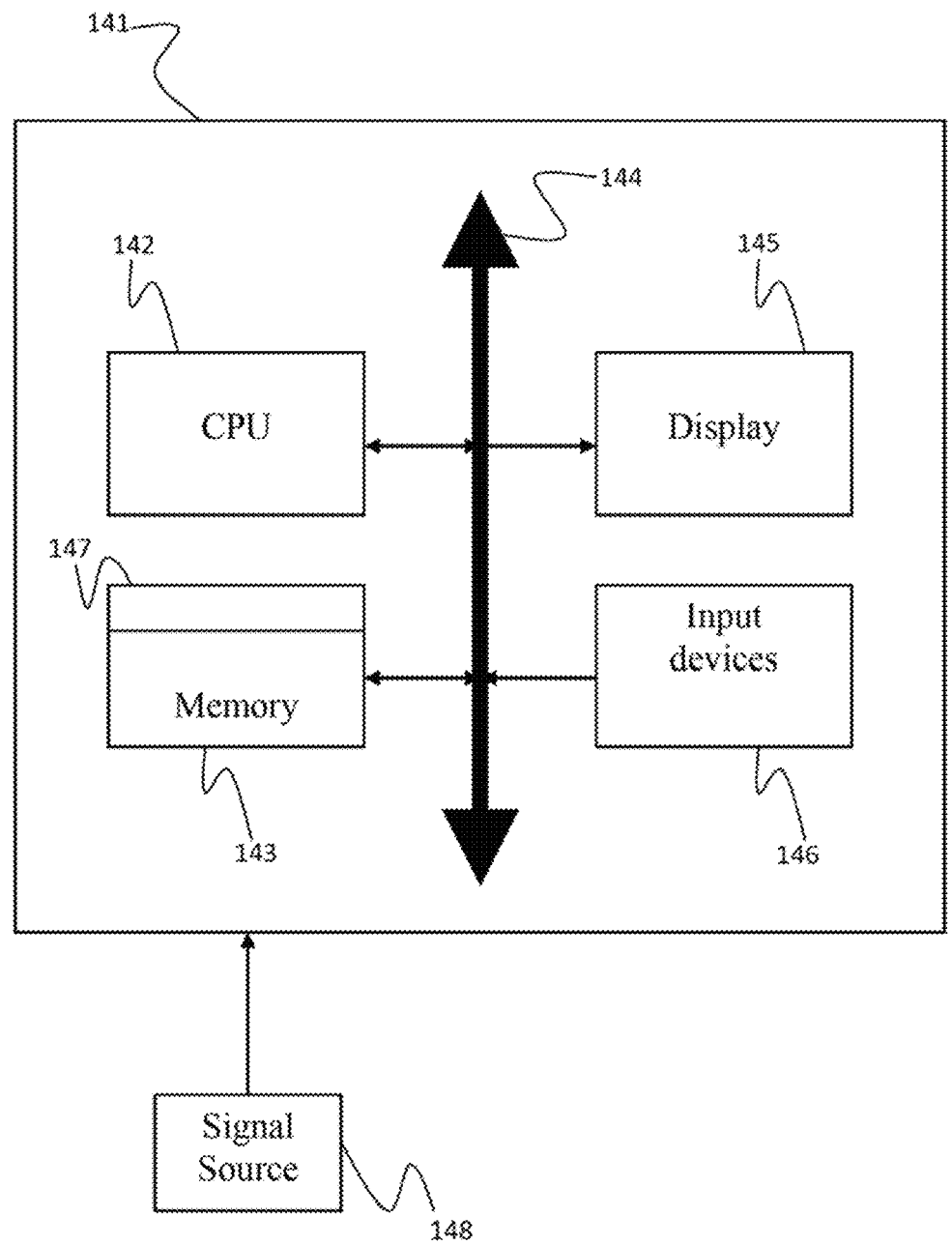
FIG. 14 is a block diagram of a system that implements a method for estimating rectification transformations for stereo images in video sequences, according to an embodiment of the disclosure.

FIG. 14 is a block diagram of a system that implements a method for estimating rectification transformations for stereo images in video sequences according to an embodiment of the disclosure that consumes low power and maintains the required precision. Referring now to FIG. 14, a computer system 141 for implementing the present invention can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present disclosure can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present invention. Alternatively, as described above, embodiments of the present disclosure can be implemented as an ASIC or FPGA 147 that is in signal communication with the CPU 142 to process the signal from the signal source 148.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of rectifying stereo images, comprising the steps of:
   providing a sequence of stereo video images;
   providing a plurality of pairs of sets of keypoints extracted from a pair of current stereo images in the sequence of stereo video images and from a pair of previous stereo images in the sequence of stereo video images, wherein each pair of stereo images includes a left image and a right image respectively obtained from a left camera and a right camera;
   providing a plurality of pairs of sets of next-choice-match points extracted from the pair of current stereo images and the pair of previous stereo images;
   finding one or more anchor points in a left previous image, wherein an anchor point is a keypoint in the left previous image that has both a corresponding keypoint in a right previous image and a corresponding keypoint in a left current image;
   finding a right linking point which is the corresponding keypoint in the right previous image, and a left linking point which is the corresponding keypoint in the left current image;
   finding a closing point which is the keypoint in the right current image that corresponds to corresponding keypoint in the right previous image and the corresponding keypoint in the left current image; and
   calculating a cost from the right linking point, the left linking point, and the closing point, wherein the cost is a measure of distances between the right linking point, the left linking point and the closing point and their respective correpsonding keypoints in the right previous image, the left current image and the right current image.

2. The method of claim 1, further comprising:
   repeating for all anchor points the steps of finding a right linking point, finding a left linking point, finding a closing point, and calculating a tracking cost;
   selecting those keypoints whose tracking cost is less than a predetermined threshold to a list $S_n^{corr}$ of candidate keypoints, wherein n is an index of the pair of current stereo images;
   calculating a homography matrix H from the candidate keypoint list;
   calculating a fundamental matrix F from the candidate keypoint list;
   calculating, from the homography matrix and the fundamental matrix, perspective projection matrices $P_0$, $P_1$ that project, for each of the left camera and the right camera, respectively, a point in a 3-dimensional space $\mathcal{P}^3$ to a point in a 2-dimensional image plane $\mathcal{P}^2$;
   calculating rectifying transformations $T_l$ and $T_r$ from the perspective projection matrices that map the image-planes of the perspective projection matrices to the image-planes of the rectified perspective projection matrices, respectively; and
   applying transformation $T_l$ on the left image and transformation $T_r$ on the right image to yield a pair of rectified images.

3. The method of claim 1, wherein finding a linking point comprises the steps of:
   providing a set of keypoints in an image and a set of next-choice-match points in that image; and
   finding a point in the set of next-choice-match points that is in the set of keypoints.

4. The method of claim 1, wherein finding a closing point comprises the steps of:
   providing a first set of next-choice-match points in an image and a second set of next-choice-match points in that image; and
   finding a point in the first set of next-choice-match points that matches a point in the second set of next-choice-match points.

5. The method of claim 1, wherein
   the plurality of pairs of sets of keypoints includes
      a set of pairs of corresponding-keypoints in the previous stereo images $\{p_{l_{n-1}}^{corr}, p_{r_{n-1}}^{corr}\}$,
      a set of pairs of corresponding-keypoints in the current stereo images $\{p_{l_n}^{corr}, p_{r_n}^{corr}\}$,
      a set of pairs of matched-keypoints in adjacent left images $\{p_{l_{n-1}}^{adj}, p_{l_n}^{adj}\}$,
      a set of pairs of matched-keypoints in adjacent right images $\{p_{r_{n-1}}^{adj}, p_{r_n}^{adj}\}$; and
   the plurality of pairs of sets of next-choice-match points includes sets $\tilde{p}_{r_n}^{corr}, \tilde{p}_{r_{n-1}}^{corr}, \tilde{p}_{r_n}^{adj}$ and $\tilde{p}_{l_n}^{adj}$ that respectively correspond to the sets $p_{r_n}^{corr}, p_{r_{n-1}}^{corr}, p_{r_n}^{adj}$ and $p_{l_n}^{adj}$.

6. The method of claim 5, wherein calculating the tracking cost from the right linking point, the left linking point, and the closing point comprises calculating $$\text{cost} \triangleq \alpha_1 \| KP_{l_n}[p_{l_n}[i]] - KP_{l_n}[\tilde{p}_{l_n}^{adj}[k][k_{ROA}]] \| +$$
$$\alpha_2 \| KP_{r_{n-1}}[p_{r_{n-1}}[i]] - KP_{r_{n-1}}[\tilde{p}_{r_{n-1}}^{corr}[j][j_{ROA}]] \| +$$
$$\alpha_3 \| KP_{r_n}[p_{r_n}[i]] - KP_{r_{n-1}}[\tilde{p}_{r_n}^{adj}[i][j_{ROA}]] \|,$$

wherein
   i is an index of an anchor point,
   k is an index of a keypoint in the set $\tilde{p}_{l_n}^{adj}$ that corresponds to keypoint i,
   j is an index of a keypoint in the set $\tilde{p}_{r_{n-1}}^{corr}$ that corresponds to keypoint i,
   l is an index of the right linking point in the set $p_{r_{n-1}}^{adj}$,
   $k_{ROA}$ is an index of the left linking point in the set $\tilde{p}_{l_n}^{adj}$,
   $j_{ROA}$ is an index of the right linking point in the set $\tilde{p}_{r_{n-1}}^{corr}$,
   $l_{ROA}$ is an index of the closing point in the set $\tilde{p}_{r_n}^{adj}$,
   $p_{l_n}[i]$ is the left linking point for anchor point i,
   $p_{r_{n-1}}[i]$ is the right linking point for anchor point i,
   $p_{r_n}[i]$ is the closing point for anchor point i, $\tilde{p}_{l_n}^{adj}[k][k_{ROA}]$, and
   $KP_{l_n}[\ ], KP_{r_{n-1}}[\ ],$ and $KP_{r_n}[\ ]$ represent coordinates of their respective keypoint arguments, and
   $\alpha_1, \alpha_2, \alpha_3$ are predetermined weighting parameters.

7. The method of claim 2, wherein the homography matrix H is defined as $$H = \begin{pmatrix} 1 & -\theta_H & f \cdot \psi_H \\ \theta_H & 1 & -f \cdot \phi_H \\ -\frac{1}{f} \cdot \psi_H & \frac{1}{f} \cdot \phi_H & s \end{pmatrix},$$

wherein Euler angles $\theta_H$, $\psi_H$ and $\phi_H$ represent small angle approximations for roll, yaw and pitch respectively, s is a zoom-in factor and f is a pre-determined approximate focal length, wherein calculating the homography matrix includes finding a vector $c=(\phi_H, \psi_H, \theta_H, s)^T$ that minimizes a non-linear functional $$\underset{c}{\operatorname{argmin}} \|\hat{x}_r(c) - x_r\|_{\ell_2}^2 + \|\hat{y}_r(c) - y_r\|_{\ell_2}^2,$$

wherein $$\hat{x}_r = \frac{f_u(c)}{g(c)}, \hat{y}_r = \frac{f_v(c)}{g(c)}, \text{ and}$$

$$f_u(c) \triangleq x_l - y_l \cdot c[3] + f \cdot c[2],$$

$$f_v(c) \triangleq x_l \cdot c[3] + y_l - f \cdot c[1], \text{ and}$$

$$g(c) \triangleq -\frac{1}{f} \cdot x_l \cdot c[2] + \frac{1}{f} \cdot y_l \cdot c[1] + c[4].$$

8. The method of claim 2, wherein the fundamental matrix F is a rank-2 matrix that maps each keypoint $m_r(i)$ in a right image to its epipolar line in a corresponding left image:

$$m_l(i)^T \cdot F \cdot m_r(i) = 0, \text{ for all keypoints } i,$$

wherein calculating the fundamental matrix comprises calculating a matrix $\tilde{F}$ that minimizes a mapping error between the right image and the left image, and finding a rank-2 matrix F that is closest to the matrix $\tilde{F}$ that minimizes the mapping error.

9. The method of claim 2, wherein the perspective projection matrices $P_0$, $P_1$ are defined as $$P_0 = K_0[I \mid 0], \quad P_1 = K_1[R \mid t], \text{ wherein}$$

$$K_i = \begin{pmatrix} f_i & 0 & 0 \\ 0 & f_i & 0 \\ 0 & 0 & 1 \end{pmatrix}, \quad i = 0, 1,$$

$$R = \begin{pmatrix} R_{1,1} & R_{1,2} & R_{1,3} \\ R_{2,1} & R_{2,2} & R_{2,3} \\ R_{3,1} & R_{3,2} & R_{3,3} \end{pmatrix},$$

$$t = \begin{pmatrix} t_{1,1} \\ t_{2,1} \\ t_{3,1} \end{pmatrix},$$

1 is a 3×3 identity matrix and 0 is 1×3 zeros vector $$\begin{pmatrix} 0 \\ 0 \\ 0 \end{pmatrix},$$

R is a rotation matrix, t is a translation vector, and the parameters $f_i$ are determined from a singular value decomposition of the fundamental matrix F, wherein rotation R followed by translation t present a mapping of points in a 3-dimensional world to a coordinate system of the right camera.

10. The method of claim 2, wherein rectifying transformations $T_l$ and $T_r$ are defined as $T_l = K_0 \cdot \tilde{R} \cdot K_0^{-1}$, $T_r = K_0 \cdot \tilde{R} \cdot R^T \cdot K_1^{-1}$, wherein R is a rotation matrix that represents an orientation of the right camera relative to the left camera, and $(-R^T t)$ represents a center of the right camera in a coordinates-system of the left camera, and $$\tilde{R} \triangleq \begin{bmatrix} \left(\frac{1}{\|R^T t\|} \cdot R^T t\right)^T \\ (0, 0, 1) \times \left(\frac{1}{\|R^T t\|} \cdot R^T t\right)^T \\ \left(\frac{1}{\|R^T t\|} \cdot R^T t\right)^T \times \left((0, 0, 1) \times \left(\frac{1}{\|R^T t\|} \cdot R^T t\right)^T\right) \end{bmatrix}.$$

11. The method of claim 2, further comprising reducing projective distortion in the pair of rectified images by estimating an error in the rectifying transformations $T_l$ and $T_r$ for each pair of images, and skipping a current pair if an estimated error is above a threshold, by calculating rectifying transformations $T_l$ and $T_r$ for informative frames of a scene whose estimated error is below a threshold and using these rectifying transformations $T_l$ and $T_r$ for less informative frames, and by incorporating those keypoints in the list of candidate keypoints into the plurality of pairs of sets of keypoints of subsequent pairs of stereo images.

12. The method of claim 11, wherein reducing projective distortion further comprises using the fundamental matrix and the corresponding keypoints set $\{p_{l_n}^{corr}, p_{r_n}^{corr}\}$ and the arrays of rank-ordered next choice matches in the right image $\tilde{p}_{r_n}^{corr}$ to update, without loss of generality, the rank-ordered array of index m, so that correspondences in $\tilde{p}_{r_n}^{corr}[m]$ are reordered by their Euclidian 2D distance to the epipolar line of the corresponding keypoint in the left image, $p_{l_n}^{corr}[m]$.

13. The method of claim 11, wherein reducing projective distortion further comprises:

providing a list of corresponding-keypoints that includes coordinates of a keypoint in the left image, coordinates of a corresponding keypoint in the right image, a timestamp indexing a last frame where the correspondence was tagged as an inlier, and the cost;

organizing the list of correspondences according to a location of a corresponding keypoint in the left image, adding those correspondences that minimize the tracking cost to an enriched list of candidate keypoints, wherein points in the enriched list are used along with points in the list of candidate keypoints to calculate the fundamental matrix.

14. A system for estimating rectification transformations in stereo video sequences, comprising:

a pair of actuators, one for each camera of stereo video acquisition system, wherein an each actuator is an electromechanical module inside each camera that controls a focus and indirectly changes a focal length of each camera;

a pair of look-up tables (LUTs) that respectively correspond to the pair of actuators that map between a state of each actuator and an approximate focal length value of the camera associated with each actuator; and at least one processor in signal communication with the pair of look-up tables and programmed to implement a rectification transformation estimation unit that estimates rectification transformations in pairs of stereo images extracted from a stereo video sequence by tracking keypoints for a current pair of stereo images;

selecting those keypoints whose cost is less than a predetermined threshold to a list of candidate keypoints, wherein the cost is a measure of distances between the selected keypoints;

calculating a homography matrix H from the candidate keypoint list and the approximate focal lengths of each camera;

calculating a fundamental matrix F from the candidate keypoint list;

calculating, from the homography matrix and the fundamental matrix, perspective projection matrices $P_0$, $P_1$ that project, for each of the left camera and the right camera, respectively, a point in a 3-dimensional space $\mathcal{P}^3$ to a point in a 2-dimensional image plane $\mathcal{P}^2$;

calculating rectifying transformations $T_l$ and $T_r$ from the perspective projection matrices that map the image-planes of the perspective projection matrices to the image-planes of the rectified perspective projection matrices, respectively; and applying transformation $T_l$ on the left image and transformation $T_r$ on the right image to yield a pair of rectified images.

15. The system of claim 14, wherein when the homography matrix H is valid OR the rectification transformations are valid then the rectification transformation estimation unit outputs the valid rectification transformations, otherwise the rectification transformation estimation unit processes a next pair of stereo images;

wherein when the homography matrix H is compatible with the perspective projection matrices then the rectification transformation estimation unit outputs focal length values estimated from the perspective projection matrices to the LUTs and outputs the valid rectification transformations, and wherein when the perspective projection matrices are invalid and the homography matrix is valid, then the rectification transformation estimation unit outputs the homography matrix, otherwise the rectification transformation estimation unit outputs the valid rectification transformations.

16. The system of claim 14, wherein tracking keypoints for a current pair of stereo images comprises providing a plurality of pairs of sets of keypoints extracted from a pair of current stereo images in the sequence of stereo video images and from a pair of previous stereo images in the sequence of stereo video images, wherein each pair of stereo images includes a left image and a right image respectively obtained from a left camera and a right camera;

providing a plurality of pairs of sets of next-choice-match points extracted from the pair of current stereo images and the pair of previous stereo images;

finding one or more anchor points in a left previous image, wherein an anchor point is a keypoint in the left previous image that has both a corresponding keypoint in a right previous image and a corresponding keypoint in a left current image;

finding a right linking point which is the corresponding keypoint in the right previous image, and a left linking point which is the corresponding keypoint in the left current image;

finding a closing point which is the keypoint in the right current image that corresponds to corresponding keypoint in the right previous image and the corresponding keypoint in the left current image; and calculating a cost from the right linking point, the left linking point, and the closing point.

17. A non-transitory program storage device readable by a computer, tangibly embodying a program of instructions executed by the computer to perform the method steps for rectifying stereo images, comprising the steps of:

providing a sequence of stereo video images;

providing a plurality of pairs of sets of keypoints extracted from a pair of current stereo images in the sequence of stereo video images and from a pair of previous stereo images in the sequence of stereo video images, wherein each pair of stereo images includes a left image and a right image respectively obtained from a left camera and a right camera, wherein the plurality of pairs of sets of keypoints includes a set of pairs of corresponding-keypoints in the previous stereo images $\{p_{l_{n-1}}^{corr}, p_{r_{n-1}}^{corr}\}$, a set of pairs of corresponding-keypoints in the current stereo images $\{p_{l_n}^{corr}, p_{r_n}^{corr}\}$, a set of pairs of matched-keypoints in adjacent left images $\{p_{l_{n-1}}^{adj}, p_{l_n}^{adj}\}$, a set of pairs of matched-keypoints in adjacent right images $\{p_{r_{n-1}}^{adj}, p_{r_n}^{adj}\}$; and the plurality of pairs of sets of next-choice-match points includes sets $\tilde{p}_{r_n}^{corr}$, $\tilde{p}_{r_{n-1}}^{corr}$, $\tilde{p}_{r_n}^{adj}$ and $\tilde{p}_{l_n}^{adj}$ that respectively correspond to the sets $p_{r_n}^{corr}$, $p_{r_{n-1}}^{corr}$, $p_{r_n}^{adj}$ and $p_{l_n}^{adj}$, providing a plurality of pairs of sets of next-choice-match points extracted from the pair of current stereo images and the pair of previous stereo images;

finding one or more anchor points in a left previous image, wherein an anchor point is a keypoint in the left previous image that has both a corresponding keypoint in a right previous image and a corresponding keypoint in a left current image;

finding a right linking point which is the corresponding keypoint in the right previous image, and a left linking point which is the corresponding keypoint in the left current image;

finding a closing point which is the keypoint in the right current image that corresponds to corresponding keypoint in the right previous image and the corresponding keypoint in the left current image; and calculating a cost from the right linking point, the left linking point, and the closing point by calculating $$\text{cost} \triangleq \alpha_1 \| KP_{l_n}[p_{l_n}[i]] - KP_{l_n}[\tilde{p}_{l_n}^{adj}[k][k_{ROA}]] \| +$$
$$\alpha_2 \| KP_{r_{n-1}}[p_{r_{n-1}}[i]] - KP_{r_{n-1}}[\tilde{p}_{r_{n-1}}^{corr}[j][j_{ROA}]] \| +$$
$$\alpha_3 \| KP_{r_n}[p_{r_n}[i]] - KP_{r_{n-1}}[\tilde{p}_{r_n}^{adj}[i][j_{ROA}]] \|,$$

wherein i is an index of an anchor point, k is an index of a keypoint in the set $\tilde{p}_{l_n}^{adj}$ that corresponds to keypoint i, j is an index of a keypoint in the set $\tilde{p}_{r_{n-1}}^{corr}$ that corresponds to keypoint i, l is an index of the right linking point in the set $p_{r_{n-1}}^{adj}$, $k_{ROA}$ is an index of the left linking point in the set $\tilde{p}_{l_n}^{adj}$, $j_{ROA}$ is an index of the right linking point in the set $\tilde{p}_{r_n}^{corr}$, $l_{ROA}$ is an index of the closing point in the set $\tilde{p}_{r_n}^{adj}$, $p_{l_n}[i]$ is the left linking point for anchor point i, $p_{r_n}[i]$ is the right linking point for anchor point i,
$p_{r_n}[i]$ is the closing point for anchor point i, $\tilde{p}_{l_n}^{adj}[k]$ $[k_{ROA}]$, and
$KP_{l_n}[\ ], KP_{r_{n-1}}[\ ],$ and $KP_{r_n}[\ ]$ represent coordinates of their respective keypoint arguments, and
$\alpha_1, \alpha_2, \alpha_3$ are predetermined weighting parameters.

18. The computer readable program storage device of claim 17, wherein the method further comprises:
repeating for all anchor points the steps of finding a right linking point, finding a left linking point, finding a closing point, and calculating a tracking cost;
selecting those keypoints whose tracking cost is less than a predetermined threshold to a list $S_n^{corr}$ of candidate keypoints, wherein n is an index of the pair of current stereo images;
calculating a homography matrix H from the candidate keypoint list;
calculating a fundamental matrix F from the candidate keypoint list;
calculating, from the homography matrix and the fundamental matrix, perspective projection matrices $P_0, P_1$ that project, for each of the left camera and the right camera, respectively, a point in a 3-dimensional space $\mathcal{P}^3$ to a point in a 2-dimensional image plane $\mathcal{P}^2$;
calculating rectifying transformations $T_l$ and $T_r$ from the perspective projection matrices that map the image-planes of the perspective projection matrices to the image-planes of the rectified perspective projection matrices, respectively; and
applying transformation $T_l$ on the left image and transformation $T_r$ on the right image to yield a pair of rectified images.

19. The computer readable program storage device of claim 17, wherein finding a linking point comprises the steps of:
providing a set of keypoints in an image and a set of next-choice-match points in that image; and
finding a point in the set of next-choice-match points that is in the set of keypoints.

20. The computer readable program storage device of claim 17, wherein finding a closing point comprises the steps of:
providing a first set of next-choice-match points in an image and a second set of next-choice-match points in that image; and
finding a point in the first set of next-choice-match points that matches a point in the second set of next-choice-match points.

* * * * *